US012615413B1

(12) United States Patent
Mamidwar et al.

(10) Patent No.: US 12,615,413 B1
(45) Date of Patent: Apr. 28, 2026

(54) LOW LATENCY VIDEO STREAMING—MODIFIED FRAME RATES

(71) Applicant: Avago Technologies International Sales Pte. Limited, Singapore (SG)

(72) Inventors: Rajesh Mamidwar, San Diego, CA (US); Xuemin Chen, Rancho Santa Fe, CA (US); Brian Heng, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/932,369

(22) Filed: Oct. 30, 2024

(51) Int. Cl.
*H04N 21/4402* (2011.01)

(52) U.S. Cl.
CPC ............................ *H04N 21/440281* (2013.01)

(58) Field of Classification Search
None
See application file for complete search history.

(56) References Cited

U.S. PATENT DOCUMENTS

2011/0002376 A1 1/2011 Ahmed et al.
2012/0147973 A1 6/2012 Wu et al.

2013/0223538 A1 8/2013 Wang et al.
2016/0134931 A1 5/2016 Song et al.
2018/0013978 A1 1/2018 Duan et al.
2021/0142742 A1 5/2021 Ishii
2023/0156150 A1* 5/2023 Yoo ......................... H04N 21/24
348/437.1

FOREIGN PATENT DOCUMENTS

EP 3903896 B1 11/2021

OTHER PUBLICATIONS

Extended European Search Report, European Application No. 25211583.7 dated Feb. 5, 2026, 12 pages.
Extended European Search Report, European Application No. 25211559.7 dated Feb. 6, 2026, 10 pages.
Extended European Search Report, European Application No. 25211542.3 dated Feb. 5, 2026, 10 pages.

* cited by examiner

*Primary Examiner* — Junior O Mendoza
(74) *Attorney, Agent, or Firm* — King Intellectual Asset Management

(57) ABSTRACT

In an example, a device may include logic to receive a plurality of video frames from a video source, logic to process the plurality of video frames, logic to provide at least some of the plurality of video frames to a video sink, and logic to reduce a display latency of each of the video frames provided to the video sink by changing the frame rate of some or all of the frames.

20 Claims, 22 Drawing Sheets

Receive Plurality of Video Frames
*402*

Process Plurality of Video Frames
*404*

Reduce Display Latency of Video Frames
*406*

Selectively Disable Latency Reduction
*408*

Provide Video Frames to Video Sink
*410*

*400*

Receive Plurality of Video Frames
*402*

Process Plurality of Video Frames
*404*

Reduce Display Latency of Video Frames
*406*

Selectively Disable Latency Reduction
*408*

Provide Video Frames to Video Sink
*410*

*400*

Decode Encoded Frames
502

Reduce Stored Frames
504

Determine Available Decoded Frames
506

Identify Most Recent Decoded Frame
508

Discard Frames
510

Store Reference Frames
512

Generate Frame from Reference Frame(s)
514

Provide Decoded Portion of Frame to Output
516

500

Receive Video Frames
*1502*

Process Video Frames
*1504*

Provide Video Frames to Video Sink
*1506*

*1500*

Encode Frame(s)

*1602*

Decode Frame(s)

*1604*

Process Subframe(s)

*1606*

Generate Composite Frames

*1608*

*1600*

F1

| SF1 | SF2 | SF3 | SF4 |
| SF5 | SF6 | SF7 | SF8 |
| SF9 | SF10 | SF11 | SF12 |
| SF13 | SF14 | SF15 | SF16 |

Fig. 17

LOW LATENCY VIDEO STREAMING—MODIFIED FRAME RATES

CROSS-REFERENCES TO RELATED APPLICATIONS

This application may be related to the following applications, each filed on a date herewith by the inventors hereof: U.S. patent application Ser. No. 18/932,328, titled "Low Latency Video Streaming-Reducing Frame Buffers"; and U.S. patent application Ser. No. 18/932,361, titled "Low Latency Video Streaming—Partial Frames". The respective disclosures of each of these applications are incorporated herein by reference for all purposes.

TECHNICAL FIELD

This document relates generally to video streaming and more specifically to low latency video streaming by reducing a display latency of video frames provided to a video sink.

BACKGROUND

Traditional video streaming, whether broadcast or IP-based, has historically relied on complex network infrastructure to deliver smooth video experiences to end users. This typically involves a video player decoding and sending every video and audio frame to the TV at the right time. Such traditional approaches relied on complex network architectures and extensive buffering to ensure consistent frame delivery. This often resulted in higher costs due to increased bandwidth and storage requirements. To address these challenges, various video coding standards (e.g., MPEG2, AVC, HEVC, VP9, AV1) have been developed for efficient compression, but this often comes at the cost of increased computational complexity.

Further, to ensure smooth video playback, buffering mechanisms have been implemented at different stages of a video pipeline, including cloud servers, networks, and video players (e.g., set-top boxes or over-the-top (OTT) clients). For instance, popular streaming services like YouTube and Netflix typically buffer 10-40 seconds of video frames.

Emerging applications such as cloud gaming, video conferencing, and virtual reality demand low-latency performance. These applications are driving the development of new network, encoder, and system standards. The cloud gaming has gained popularity as internet speeds have improved. In this model, the actual gaming server resides in the cloud, while the local game controller sends commands to the cloud server. The game is rendered on the cloud server, and the encoded video is transmitted to the user's device (e.g., TV or set-top box) over the video pipeline for display.

Further, the video conferencing applications have become essential for remote work, online education, and telehealth. Low latency is crucial for a seamless experience. Many users are turning to OTT devices or set-top boxes for larger screen displays, as opposed to traditional conference equipment. Furthermore, the virtual reality experiences often require high-resolution video and low latency. Cloud-based rendering can provide the necessary processing power, while local devices can focus on displaying the rendered content.

For applications such as gaming, video conference, and virtual reality and the like, end-to-end latency is more important than smooth video. Traditional set-top boxes and OTT devices, designed for smooth streaming video, often rely on fixed frame rates and buffering at multiple stages of the video pipeline.

In other words, the video pipeline typically includes frame buffers at various stages, such as the encoder, decoder, video processing, high-definition multimedia interface (HDMI) input, and within the TV itself. This buffering ensures smooth playback but can also contribute to latency as each stage buffers multiple frames to ensure that complete frame data is available at the input before feeding the output stage. Traditional pipelines often require the transmission of entire frames, regardless of the number of pixels that have changed. This approach can introduce significant latency as well, which is undesirable for latency-sensitive applications like cloud gaming, video conferencing, and virtual reality.

In other examples, at the HDMI interface, the frame rate is typically fixed and cannot be adjusted dynamically during playback. For example, in a 60 FPS configuration, one complete frame of data must be sent every 1/60th of a second. If the next frame is not ready in time (i.e., an underflow condition), the previous frame is repeated, resulting in potential visual artifacts. This fixed frame rate requirement can limit the ability to reduce latency in applications that demand real-time responsiveness.

BRIEF DESCRIPTION OF THE DRAWINGS

FIG. 17 illustrates a frame comprising a plurality of subframes in accordance with some embodiments.

DETAILED DESCRIPTION

Figure 1:
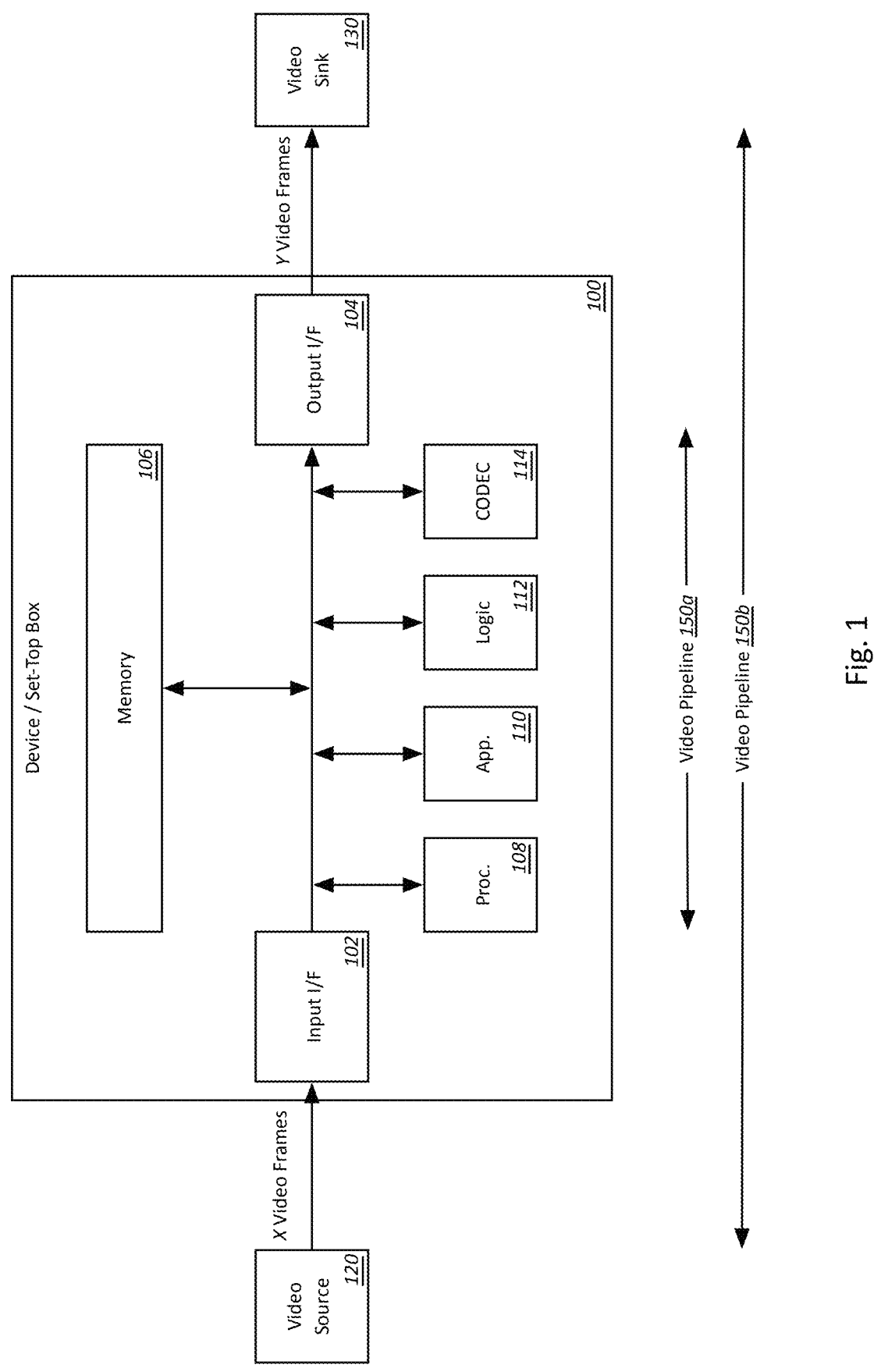
FIG. 1 is a block diagram illustrating components of a device that can reduce latency in a video pipeline in accordance with some embodiments.

Some embodiments can employ techniques, as described in further detail below to provide low-latency video streaming. Such techniques which can be employed individually and/or in combination in various embodiments. Merely by way of example, some embodiments avoid or reduce frame buffers in a video pipeline. Some embodiments can employ partial frame processing (e.g., encoding and/or decoding, etc.), which can reduce per-frame processing time and reduce and/or minimize latency. Some embodiments can provide a flexible output frame rate by allowing the video pipeline to decouple the output frame rate from the input frame rate and/or dynamically adjust the frame rate, including through the use of subframes; this can optimize performance and reduce and/or minimize latency.

Exemplary Embodiments

Certain exemplary embodiments are described below. Each of the described embodiments can be implemented separately or in any combination, as would be appreciated by one skilled in the art. Thus, no single embodiment or combination of embodiments should be considered limiting. Moreover, any of the embodiments described above FIG. 1 illustrates an example block diagram of a device 100, visually representing exemplary components of the device 100 and their interaction to reduce display latency in video frames. In an example, the device 100 is a set-top box (STB) or a component of a set-top box. As used herein, the term "set-top box" can include any device that is attached to or in communication {e.g., via an HDMI connection, etc.) a television or other display device and that provides video or other media to the display device; this can include STBs provided by cable or satellite television providers, as well as other streaming devices, such as an Apple TV™, Roku™ device, Amazon™ Firestick™, and/or the like.

In particular embodiments, the device 100 might be an integrated component, such as a system on a chip (SOC), which, merely by way of example, can be integrated with or incorporated in STBs, display devices, televisions, etc. Several embodiments describe functionality of such a device

100 using the example of a STB, but the reader should appreciate that the described functionality is not limited to an STB implementation, and different embodiments can include different devices 100 that perform such functions described herein, either as individual units or as an integrated whole, including encoders and/or decoders (which that can be used by a media server video conference server, came server, etc.), STBs, televisions, computing devices, mobile devices, and/or the like.

The device 100 includes an input interface 102, which can include any devices or components that are capable of, or necessary for, receiving media from a video source 120, including without limitation one or more physical interfaces, such as wired (local area network (LAN)) or wireless network interfaces (wireless LAN (WLAN), wireless wide area network (WWAN, cellular)) e.g., those described in further detail below, cable and/or satellite television interfaces, multimedia (e.g., HDMI) interfaces, and/or the like. The input interface 102 can also include any hardware, firmware, or software (collectively, logic) necessary to receive and/or convert media received via such physical interfaces, including without limitation reception of cable or satellite television signals, over-the-top ("OTT") television signals, and/or the like. As described in further detail below, the term "logic" is used broadly herein to describe any hardware circuitry, firmware instructions, software instructions, and/or processors implementing such instructions, to provide functionality described herein.

The video source 120 can vary depending on a specific application and technology used. For example, in cloud gaming, the video source 120 can be a cloud server, which generates the video frames and transmits to the device 100. In virtual reality, the video source 120 can be a 3D rendering engine that creates and transmits the virtual environment. In video conferencing, the video source 120 is the user's webcam. Each participant's webcam captures their video and transmits it to the conferencing platform, which then transmits the video to the device 100. In such examples, the video source 120 may involve the generation or capture of video content that is then transmitted to the device 100 for display.

The device 100 also includes one or more output interface (s) 104, which can include any devices or components that are capable of, or necessary for, providing media output to a video sink 230. This can include, without limitation, one or more physical interfaces, such as wired or wireless network interfaces (e.g., those described in further detail below), cable and/or satellite television interfaces, multimedia (e.g., HDMI) interfaces, and/or the like. The output interface 104 can also include any hardware, firmware, or software (collectively, logic) necessary to convert and/or transmit media received via such physical interfaces.

In some embodiments, the device 100 includes memory 106, which can be used to store logic (e.g., instructions) executable by one or more processor(s) 108 to perform various functions described herein. Examples of such memory 106 and processor(s) 108 are described in further detail below. In some embodiments, such logic can include an application (app) 110 (which, alternatively and/or additionally can be implemented as, and is described generally as logic 114, which is described in further detail herein), which can cause the device 100 (and/or components thereof) to perform operations as described in further detail herein. The app 110 can be used to ingest and/or process video, as described in further detail herein.

In an example, the logic 114 might include logic to receive a plurality of encoded video frames from the video source 120. In some embodiments, the memory 106 can be used to store one or more frame buffers, including without limitation reference buffers, as described in further detail below. As used herein, the term "frame buffer" means a region of memory, e.g., memory 106, that stores a single frame of video data, i.e., the pixel data (and/or other data, such as metadata) for one frame of a video sequence. A video pipeline might comprise a number of different types of buffers. One example is a capture buffer or network buffer, which holds frames that have been received, e.g., by the device 100 before those frames are processed. Another example is a display buffer, which is used to hold a frame currently displayed by a display device or that is being received or prepared by the display device for display, and which conventionally often is a double or triple buffer that operates in ping-pong fashion as described in further detail below. Yet another example is a video processing buffer, which can store frame data of frames that have been processed by various pipeline stages (such as a decoder 114) before proceeding to the next stage of the pipeline, or an output of the device 100.

As used herein, the term "frame" means data that represents an image (often, but not necessarily, an entire display screen's worth of data). A frame often is characterized by a two-dimensional measure of pixels expressed as width×height (resolution or frame) size such as 1080×720 (high definition or HD), 1920×1080 (full high definition or FHD), 2560×1440 (quad HD or QHD), 3480×2160 (4K ultra high definition or UHD), 5120×2880 (5K UHD), 7680×4320 (8K UHD), and the like, although embodiments are not limited to frames of any particular dimensions or resolution. As used herein, the term "partial frame" means any portion of a video frame less than the entire frame, while a "full frame" is used to refer to the entire frame at the resolution of the video. The term "subframe" is used herein to refer to a particular type of partial frame: one of a group of partial frames that collectively can compose a full frame, as illustrated, for example, by FIG. 17 and described below.

A plurality of frames collectively is referred to as herein as a "stream," and a stream of frames viewed consecutively provides a series of "moving pictures," or a video. Generally, a stream of frames is provided by the video source 120 consecutively in order, although this is not required in every embodiment, and in some embodiments, the device might reorder the frames of the received stream (e.g., by dropping one or more frames of the received stream) while processing the stream to provide one or more output stream(s) of video frames to the video sink 130. In such cases, the processed frames are referred to as "out of order" from the ordered stream of frames received by the device 100.

Often, video frames are encoded for transmission. As used herein, "encode" means any operation or process that compresses or converts raw video data into a digital format that can be stored, transmitted, and played back on various devices. Raw video data is generally expressed as a sequence of pixel values for each pixel in the matrix of the frame (e.g. 1080 columns of 1900 rows of pixels in a FHD frame), with the pixel values representing color and/or intensity (such as RGB, YCbCr, etc.), optionally with control signals or clock signals An encoded frame of video is a frame of raw video that has been encoded using one or more encoding operations or processes.

Encoding general is performed by an encoder (or an encode pipeline of a CODEC), which can include logic (e.g., dedicated hardware, firmware and/or software) to perform such processes and/or operations, which can include compression, to reduce the amount of data required to represent the video; format conversion, to convert the raw video data into a specific format, such as H.26X, MPEG, etc. played back on various devices; quality adjustment; resolution and/or frame rate adjustment; audio encoding, which performs similar processes on the audio accompanying a video stream; error correction; and/or the addition of metadata to the frame or the stream itself. Such metadata generally can including things like subtitles, closed captions, chapter markers, and the like, and it can also include the types of metadata discussed further detail below. Encoding can include lossy compression, lossless compression, transform coding, and/or predictive coding, as is known in the art. In some aspects, the plurality of encoded video frames might be encoded at particular frame rate (often measured in frames per second, or (FPS)). In many cases, a video stream might be encoded and/or transmitted to the device 100 at a fixed (constant) frame rate. In some aspects, the fixed frame rate might impose an order on the video frames, as noted above.

The logic 112 can also include logic to process the plurality of video frames, e.g., as described in further detail below. In an example, the logic to process the plurality of video frames may include logic to decode (e.g., with a decoder, which is represented by a decode pipeline of the CODEC 114) at least some of the plurality of encoded video frames to produce a plurality of decoded video frames. The CODEC 114 can include logic to encode and/or decode any appropriate media format, including media encoded according to any of a variety of standards (e.g., the MPEG family of standards, the H.26x standards, etc.). In some cases, the CODEC can be implemented as a separate encoder and decoder, while in other cases, the CODEC can include integrated logic for both encoding and decoding. As described in further detail below, some embodiments include a CODEC with parallel encode and/or decode pipelines, which can allow for encoding/decoding multiple frames (or, as described in further detail below, subframes) simultaneously. In some embodiments, an encoder might not be necessary, and the CODEC 114 might be replaced with only a decoder. For example, if the device 100 receives encoded video, processing a video frame can include decoding a received frame (or a portion of a frame, such as a partial frame or subframe). In other cases, processing a video frame can comprise encoding, or re-encoding, a decoded frame (or portion of a frame) for transmission to the video sink (e.g., via a network, etc.).

As used herein, the term "pipeline" is used broadly to refer to any a series of operations or stages that video and/or audio content goes through from creation to delivery. In some embodiments, a video pipeline can encompasses an entire workflow, from capturing or generating the video, to editing, processing, and finally distributing it to the desired platforms or audiences. In other embodiments, a pipeline might include only a subset of these processes or stages. Merely by way of example, with regard to FIG. 1, one video pipeline 150 might include only operations that occur within the device 100 (e.g., from the operations of receiving or ingesting media (e.g., video frames) at the input interface 102 to providing the processed media (e.g., video frames) from the output interface 104. As another example, a second video pipeline 150*b* might encompass operations or processes occurring at the video source 120 and/or the video sink 130 as well. Particular examples of video pipelines in accordance with a various embodiments are described in further detail below.

In some embodiments, the logic 114 can include logic to provide at least some of the plurality of video frames to the video sink 130 (e.g., via one or more of the output interface(s) 104). For example, if the device 100 receives X video frames from the video source 120, the device 100 can provide Y video frames to the video sink 130. In some cases X and Y might be the same, both qualitatively and quantitatively. In other cases, however, X and Y might be quantitively different. Merely by way of example, using various techniques described below, some embodiments might receive X number of frames from the video source 120 and provide Y number of frames to the video sink 130; in such cases, Y might be less than X, and in this way, among others, some embodiments can reduce frame latency. In other embodiments, the device might receive frames with X resolution from the video source 120 and provide frames with Y resolution to the video sink 130. In this way, among others, some embodiments can reduce frame latency. Based on these examples, and on the more fulsome description below, a skilled artisan will understand that various embodiments can reduce latency in a video pipeline 150 in a number of ways.

Merely by way of example, in some embodiments, the logic to provide at least some of the plurality of decoded video frames to the video sink 130 may include logic to provide the at least some of the plurality of processed (e.g., decoded and possibly re-encoded) video frames to the video sink 130 via a High-Definition Multimedia Interface (HDMI), and at least some of the plurality of video frames via an alternate path separate from the HDMI connection, such as a second HDMI connection, data network, LAN interface, WLAN interface etc. For example, if some frames or portions of frames are transmitted as different streams (examples of which are described in further detail below), some of those streams might transmitted via HDMI, while others might be transmitted over a LAN/WLAN, etc., and/or the video sink might have capabilities of combining or otherwise handling those separate streams. The logic 114 can include logic to reduce a display latency of each of the video frames provided to the video sink 130 by reducing a number of frames in a video pipeline 150, using one or more of a variety of techniques, including without limitation those described in conjunction with the operations of the methods disclosed below, to reduce display latency of video frames in accordance with various embodiments. As used herein, the term "display latency" (or simply "latency") means the amount of time required to display a video frame at a display device (monitor, TV, etc.), e.g., as measured from the time at which the prior frame of the video stream received by the display device was displayed (or in the case of a device 100 delivering multiple streams, the time the last frame out of any of the streams provided by the device) was displayed.

Figure 2:
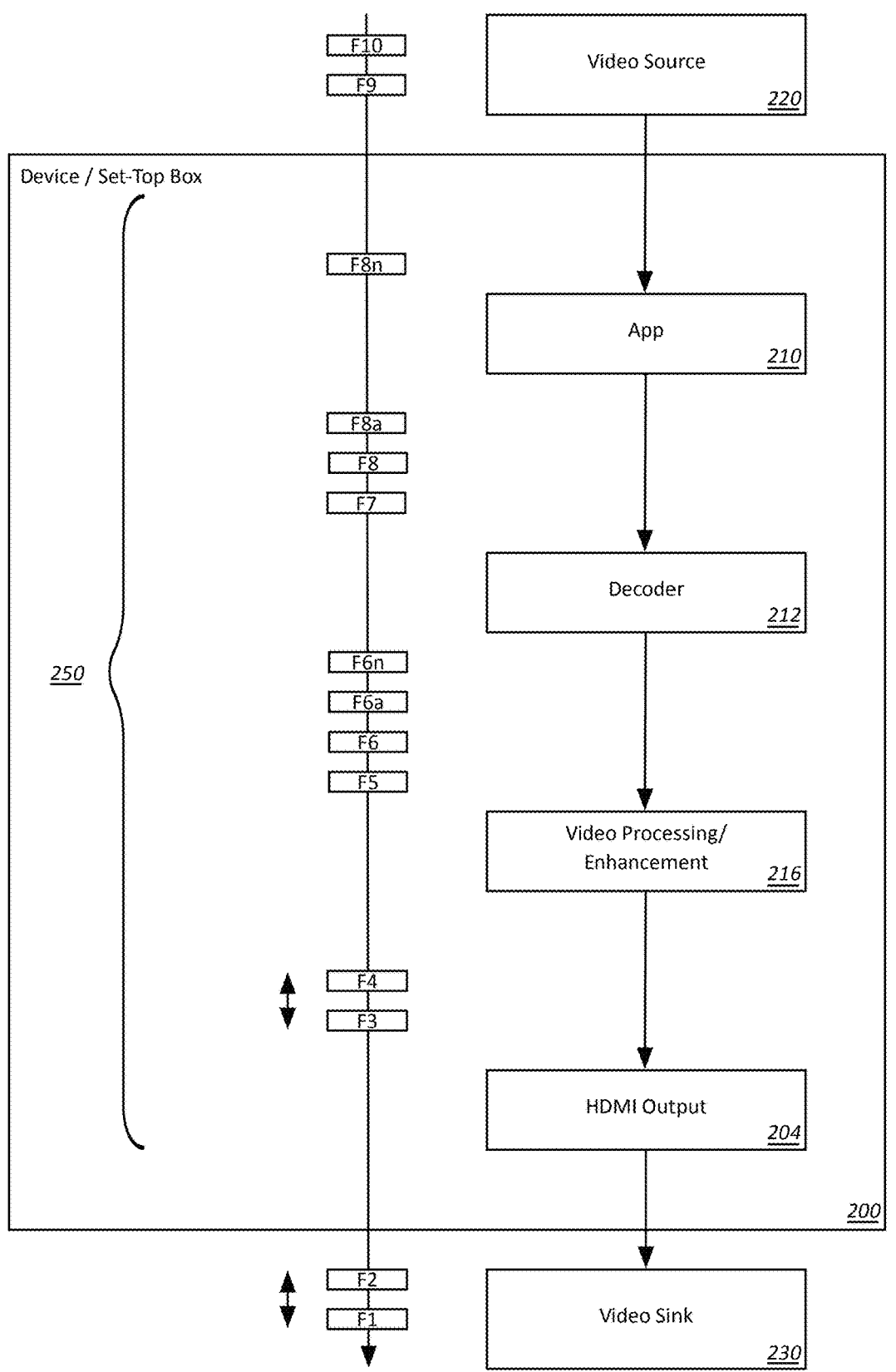
FIG. 2 is a functional block diagram illustrating a device with a video pipeline in accordance with some embodiments.

For instance, FIG. 2 illustrates a video pipeline 250 within a device 200, which can be similar to the device 100 described above; FIG. 2, however, illustrates certain functional blocks as arranged within the pipeline 250, while FIG. 1 illustrates various components of a device 100 arranged for ease of description. These functional blocks can correspond generally to various components of the device 100 of FIG. 1, as described above. FIG. 2 illustrates exemplary functional blocks of the pipeline 250 on the right side of the drawing and the progress of a plurality of frames F1-F10 through the pipeline on the left side of the diagram. Specifically, the left side of the diagram shows frames F3-F8$n$ stored in frame buffers between processing stages of the pipeline 250, while F1 and F2 have exited the pipeline 250 and have been output to the video sink 230 and F9 and F10 have not yet entered the pipeline 250.

The video pipeline 250 includes operations performed by the device 100 on a stream of video frames (F1-F10) as those frames proceed from receipt by the device 200 from a video source 220 to delivery to a video sink 230 The pipeline 250 operates in a somewhat conventional manner, in which smooth video is the goal. In the illustrated embodiment, the video frames (F) are ordered from bottom to top as they are received from the video source 220 by the device 200. So in this example, frames F1 and F2 have already been through the pipeline 250 and have been provided via an HDMI output 204 to the video sink 230, where they are stored in a display buffer in the video sink 230 and/or displayed at the video sink 230. In such applications, the video sink 230 typically will have two buffers (or a double buffer), here shown storing frames F1 and F2, which operate in "ping-pong" fashion, in which one of the buffers is displayed while the other is filled; for example, the first buffer might be filled with F1 (from the output 204 of the device 200), and while F1 is being displayed, a second buffer is filled with F2. Then, while F2 is being displayed, the first buffer is being filled with a third frame (which in this example, would be F3). The same process often occurs in frame buffers (shown as storing F3 and F4) within the device 200. It should be noted that, in some cases, the display device might have multiple processing buffers (e.g., a triple buffer) for processing frames prior to displaying them.

As noted, frames F9 and F10 have not yet reached the pipeline 250, as F9 is being transmitted by the video source 220 and F10 is being encoded (or otherwise is awaiting transmission) at the video source 220. As noted above, STBs and OTT devices are designed to support smooth streaming video and expect: fixed frames per second (FPS) video stream input, fixed FPS at output to display, and frame buffers at each pipeline stage. With whole frame buffer storage at each pipeline stage within video pipeline (e.g., at encode, decode, video processing, HDMI input and inside video sink 230), each stage waits until complete frame data is available at the input before feeding the output stage. While FIG. 2 (as well as FIGS. 6-8, discussed below) illustrates a video pipeline, it should be appreciated that an audio pipeline in the device 200 would operate in a similar fashion.

In the pipeline 250 of FIG. 2, the device 100 stores several frames in frame buffers to support smooth video playback, but this adds unnecessary latency, which is suboptimal for low-latency applications. Irrespective of the number of pixels that change from frame to frame, whole frames of data are passed through this pipeline 250. At the HDMI interface 804, the number of FPS cannot change on-the-fly from frame to frame while playing a game or video conference. For example, for a 60 FPS configuration, at every 1/60th see, one frame worth of data is sent. If the next frame is not ready in time (underflow), the previous frame is repeated, because the video sink 230 (e.g., a television) needs a frame worth of data at every 1/60th of second from the HDMI output 204. Thus, the pipeline buffers many frames (F3-F8), increasing the display latency of the frames.

For example, in FIG. 2, as noted above, F3 and F4 are stored in video processing frame buffers after the processing stage 216 (as noted above, these buffers might operate in ping-pong fashion, such that a first buffer is filled with F3 after the processing stage and then provided to the video sink 230 through the output interface 204 while the second buffer is filled with F4, which then is provided through the output 204 while the first buffer is filled with F5 (after F5 is processed at the processing stage 216).

In FIGS. 2, F5 and F6-F6$n$ have been decoded by the decoder 212 and are stored in frame buffers awaiting processing at stage 216, while F7-F8$n$ is stored in a compressed frame buffer in a queue for the decoder 212 after being received by the app 210. Frames F8-F8$n$ (as well as frames F6-F6$n$) can represent multiple frames (as described further below) being processed and/or buffered by the app 210 and decoder 212, respectively, to account for network delays.

Figure 3:
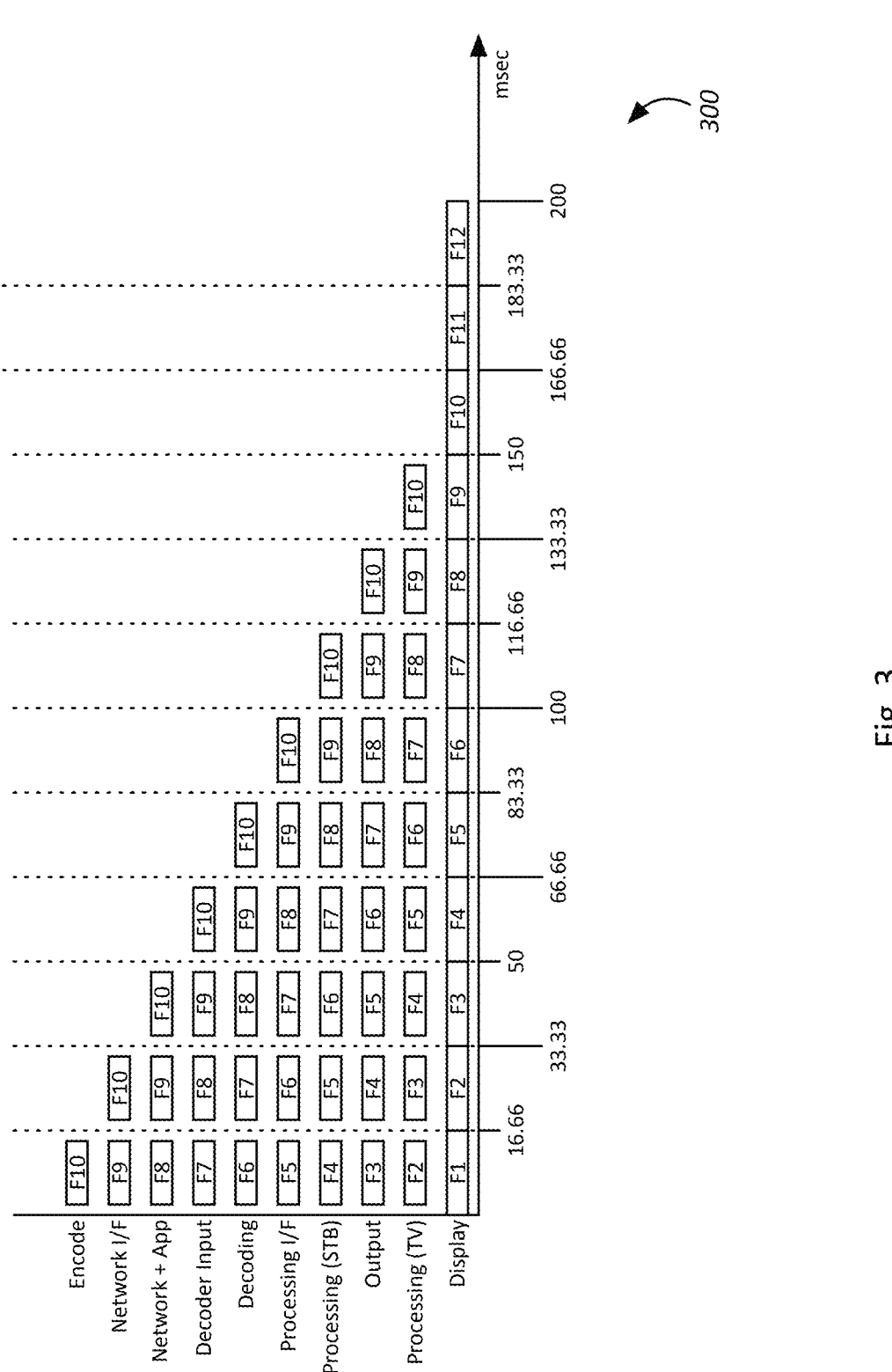
FIG. 3 is a frame timing diagram for a video pipeline in accordance with some embodiments.

Thus, in the example of FIG. 2, there are 10 frames of latency (not counting any additional buffering by the app 212 or decoder 212 of frames F6$a$-F6$n$ and F8$a$-F8$n$) between F1 being displayed at the video sink and F10, which is being prepared for transmission. FIG. 3 displays a timeline 300 for frames F1-F10 (as well as two additional frames F11 and F12 not depicted on FIG. 2). FIG. 3 illustrates the frame processed by each module and storage in each frame buffer for the duration shown by the time slices on the X axis (i.e., 16.66 msec for 60 FPS). A video sink (such as a TV) needs a complete frame time to display every time slice, and the bottom row illustrates the time slice in which frame is active on the display. For instance, F1 displayed until 16.66 msec, F2 is displayed from 16.66 to 33.33 msec, and so on. As shown by the sizes of the frames relative to the time slices on FIG. 3, the various pipeline stages (e.g., processing modules) can operate faster than this fixed frame rate, so the processing time of each frame does not occupy the entire 16.66 msec time slice. At each time slice, each module in the pipeline starts processing the next frame; for example, from 0-16.66 msec, the decoder is decoding F6 and at 16.66 msec, the decoder starts decoding F7. For simplicity, FIG. 3 disregards some real-world factors, such as network jitter and app processing time.

As noted above and demonstrated by FIG. 3, the latency from the video source to the display is approximately 10 frames (166.66 ms). Returning to FIG. 2, In actual implementation, to mitigate jitter impact and support smooth video, the app 210 often will store multiple frame buffers, which is shown in FIG. 2 as as F8, F8$a$, . . . . F8$n$ (which can be 30 seconds or more of frame data). Similarly, the decoder 212 can have multiple frame storage in the pipeline, as shown by F6, F6$a$, . . . . F6$n$. This latency helps to ensure smooth video, but it is unhelpful for low latency applications. Various embodiments provide different techniques to reduce this latency, as described in further detail below.

Figure 4:
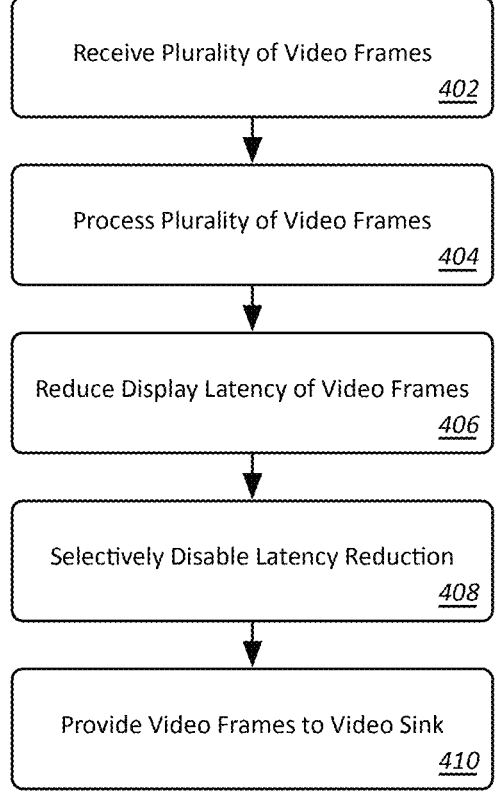
FIG. 4 is a flow diagram illustrating an exemplary method for reducing latency in a video pipeline in accordance with some embodiments.

For example, FIG. 4 illustrates a method 400 of reducing latency of video frames provided to a video sink. In some embodiments, the method 400 comprises receiving, e.g., with a device 100, such as a STB, a video encoder at a content provider, etc., a plurality of video frames from a video source (block 402). Receiving a plurality of video frames can comprise a variety of operations, examples of some of which are described in further detail below. In general, however, "receiving" a video frame or plurality of video frames comprises any operation(s) by which a video frame is obtained, received (in the conventional sense), accepted, ingested, or otherwise made available to a device 100, e.g., from a video source 120, for processing (for example, as described in further detail below) and/or distribution to a video source 130. As noted above, some embodiments can receive video frames from any of a variety of video sources.

In some embodiments, the method 400 comprises processing the plurality of video frames (block 404). In an aspect, processing at least some of the plurality of video frames can produce a plurality of processed video frames, e.g., as described in further detail below.

A number of operations, including without limitation those described in further detail below, can be considered processing one or a plurality of video frames. In general, the term "processing," in the context of video frames, is used herein to describe any operation that encodes, decodes, creates, or otherwise modifies a video frame, and/or removes, adds, modifies, or otherwise changes, one or more video frames in a stream of video frames. As used herein, the term "processing a plurality of video frames" can comprise processing one or more of the video frames in the plurality and does not require processing each frame in the plurality, unless the context clearly indicates otherwise.

In a particular aspect of some embodiments, processing a plurality of video frames (e.g., one or more video frames of the plurality of video frames) can reduce a display latency of one of the video frames, some of the video frames, or all of the plurality of video frames (block 406), e.g., using any combination of one or more of the techniques described in further detail below. Merely by way of example, in some embodiments, processing the plurality video frames can reduce a display latency of each of the video frames provided to the video sink, e.g., by reducing a number of frames in a video pipeline comprising a device, such as the device 100.

The description below describes several techniques for reducing display latency. In some embodiments, any or all such techniques can be selectively disabled, for example, some features might be disabled depending on the nature of the application associated with the video stream (e.g., when watching video content where smooth video is a priority), based on configuration settings (e.g., settings specifying when latency should be reduced and using which techniques based on resources availability, device load, content type, etc.), and/or user controls (e.g., a user configuring behavior of the device based on the user's preferences at any given time).

In some embodiments, the method 400 comprises providing at least some of the plurality of video frames to a video source 130 (block 410). A variety of techniques and/or interfaces can be used to provide video frames to a video source 130, including without limitation those described in further detail below. Merely by way of example, providing video frames to a video source 130 can comprise transmitting the video frames via one or more of the output interfaces 104 of a device 100, such as a dedicated multimedia interface (e.g., an HDMI interface), an alternate path (e.g., a LAN (or WLAN) interface), and/or the like. In some cases, a plurality of video frames might be provided to a video source 130 using multiple techniques or interfaces; for example, some of the plurality of video frames (some of the video frames in a stream of frames), might be provided via an HDMI interface, while other video frames in the stream are provided via a LAN/WLAN interface.

Figure 5:
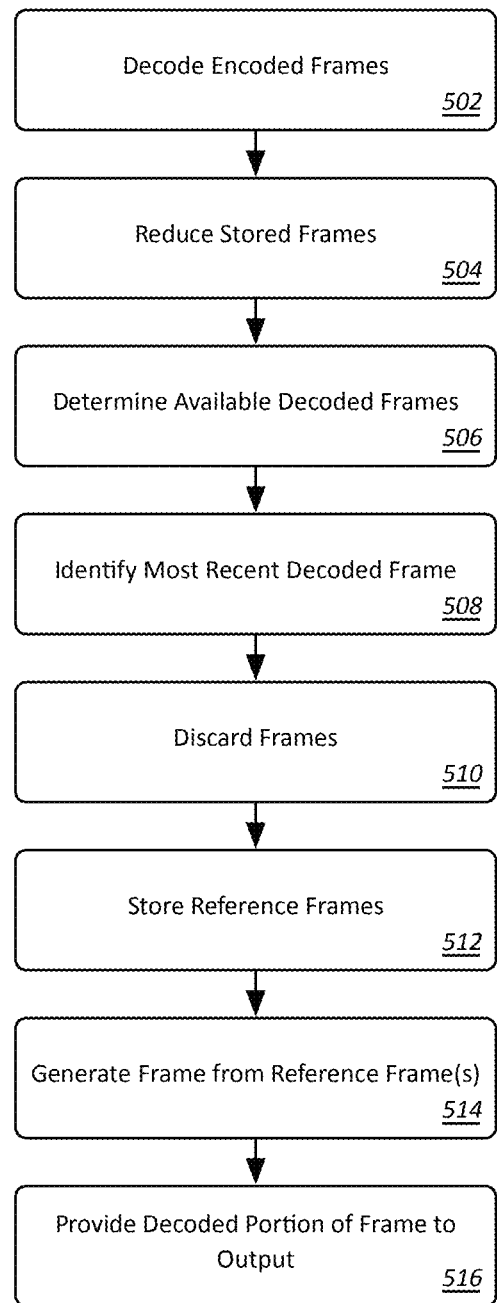
FIG. 5 is a flow diagram illustrating an exemplary method for reducing latency in a video pipeline in accordance with some embodiments.

FIG. 5 illustrates a method 500 comprising several techniques for reducing display latency, for example, by reducing the number of frames in a display pipeline (e.g., within a device such as the device 100), which can reduce the latency in the video frames provided to the video sink. Merely by way of example, with reference to FIG. 2, receiving a plurality of video frames might comprise receiving, e.g., at the device 200, a plurality of encoded video frames F1-F10 from a video source 220. In some embodiments, the plurality of encoded video frames received from the video source 220 might encoded at a fixed frame rate, which, in some cases, imposes an order on the received video frames. For example, referring back to FIG. 3, the frames F1-F10 are received by the device 200 in that order (F1, F2, . . . . F10) according to the fixed frame rate illustrated by FIG. 3, and conventionally, they would be intended to be displayed in that order, according to the fixed frame rate, to provide smooth video, as described in the context of FIG. 2

In some embodiments, the method 500 comprises decoding at least some of the plurality of encoded video frames to produce a plurality of decoded video frames (block 502). For instance, as noted above, an exemplary device 100 can include a CODEC 112 (which can serve as the decoder 212 of FIG. 2); if the received video frames are encoded (e.g., encoded as an MPEG or H.26x video stream), the device 100 can decode these video frames with the CODEC 112, which can allow further processing of the video frames, e.g., as described in further detail below. As explained in the context of FIG. 3, many operations can be performed by the device 200 more quickly than the fixed frame rate requires, and one example of such operations is the decoding stage; in some embodiments the plurality of encoded video frames can be decoded at a rate faster than the fixed frame rate.

Figure 6:
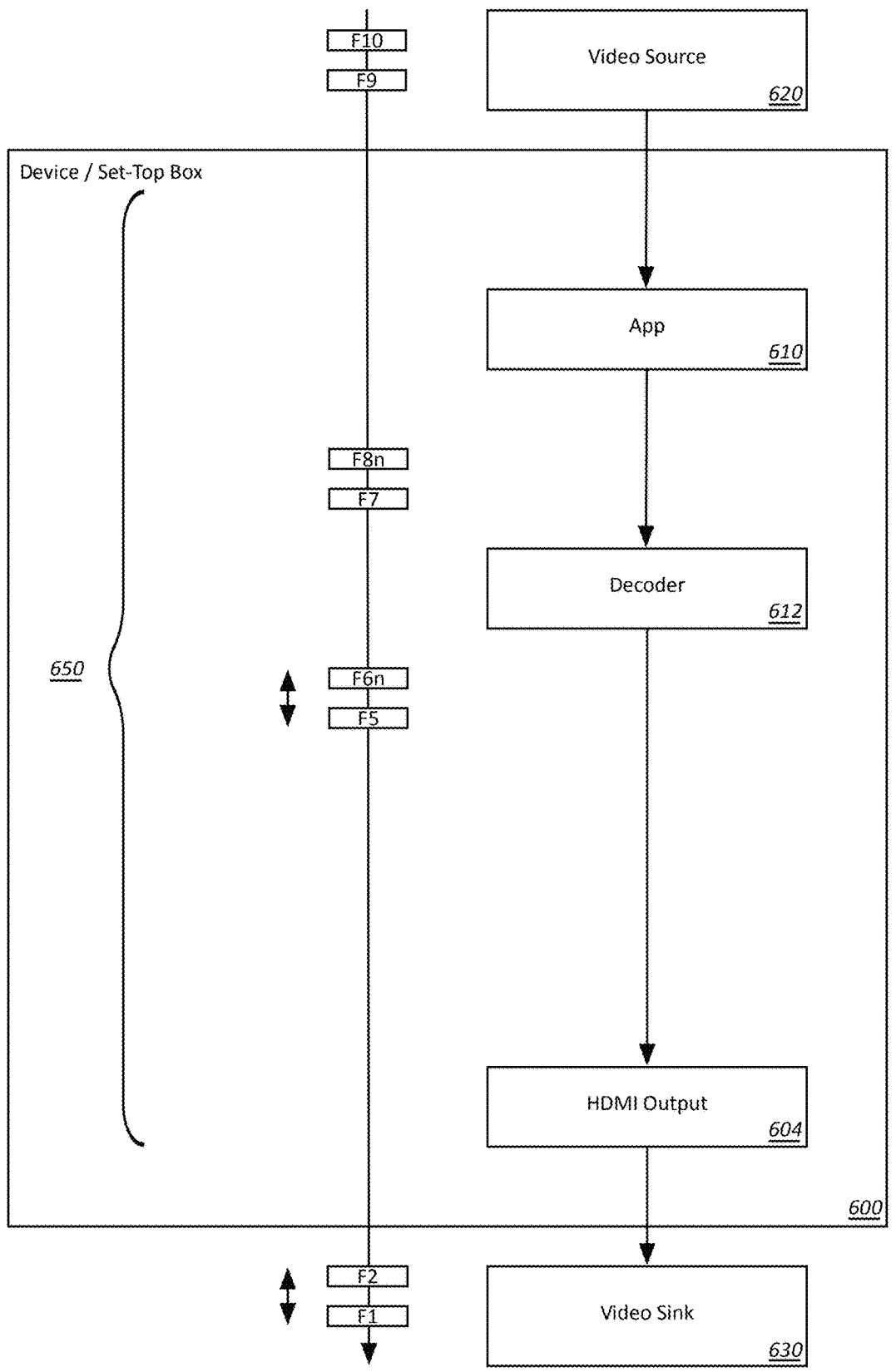
FIG. 6 is a functional block diagram illustrating a device comprising a video pipeline with reduced latency in accordance with some embodiments.

In some embodiments, processing the video frames can comprise reducing the number of frames stored in one or more buffers in the video pipeline. (block 504). Merely by way of example, as noted above, for smooth video, the intention is to play every frame, and the decoder 212 can process frames more quickly than frame rate of the incoming frames (i.e., real time), so, for most of the time the video pipeline 250 is full and has multiple frames buffered in transit from the video source 220 (e.g., a server, cable headend, etc.) to the video sink 230 (e.g., a TV screen). On the other hand, for low latency use cases, the intention is to play the latest video frame from the video source 220 as quickly as possible, so whenever there are multiple frames are available in pipeline, some embodiments display the latest frame available and drop earlier decoded frames. For example, FIG. 6 illustrates a device 600 with a video pipeline 650. Comparing FIG. 2 with FIG. 6, such embodiments might drop multiple frames (including without limitation any frames (F6, F6a, F8, F8a, F8b and so on) that have been buffered by the app 210 and/or the decoder 220 to mitigate network jitter. As described in further detail below, additional frames some embodiments can enable the discard of further frames. In this way, frames can be processed by the pipeline 250 and provided to the video sink 230 more quickly.

For example, in the case of video streaming, frame buffers often are required to store frames for video processing and/or enhancement, e.g., to adjust scaling, cropping, etc., because the same video stream is sent (broadcast) to multiple devices (e.g., 200). On the other hand, for low-latency use cases, each client (e.g., device 200) often will receive its own stream from the video source 220 (e.g., a gaming server, a video conference server, etc.) and all scaling or cropping requirements can met at the video source 220 before encoding the stream. So, local post-processing can be partially or completely eliminated and two more frames of latency can be avoided. This is illustrated by FIG. 6, in which the post-processing buffer has been eliminated from the video pipeline 650, and frames F3 and F4 have been dropped. Thus, the latency has been reduced by two frames (which can be additional to any frames buffered against network jitter, as noted above).

Thus, in some embodiments, the method 500 can comprise determining that a plurality of available decoded video frames (e.g., F3-F6n) are present in the video pipeline 250 (block 506) and/or identifying a most recently-available decoded video frame (block 508). In FIG. 6, the most recently-available decoded frame is F5, because F6 is still being used to fill the ping-pong buffer in the device 600. The remainder of the video frames in the pipeline can be discarded (block 510). In this case, those frames are F3 and F4, because F6, F6a . . . are not buffered by the decoder as noted above. Referring to FIG. 4, providing at least some of the video frames (block 410) might therefore comprise providing the most recently-available decoded video frame. In an aspect, this frame can be provided out of order with any fixed frame rate at which the plurality of frames are encoded; e.g., providing F5 without first providing F3 and F4. Thus discarding buffered frames ahead of the most-recently available frame can cause that frame to be delivered at a point in time earlier than the time specified by the fixed frame rate of the encoded stream received by the device 600, reducing the display latency of that frame. Likewise, providing at least some of the video frames might comprise providing the plurality of decoded video frames to the video sink without storing any of the plurality of decoded video frames in a video processing frame buffer, as shown by FIG. 6. In some embodiments, at least some of the plurality of decoded video frames can be provided to the video sink 620 via HDMI.

Figure 7:
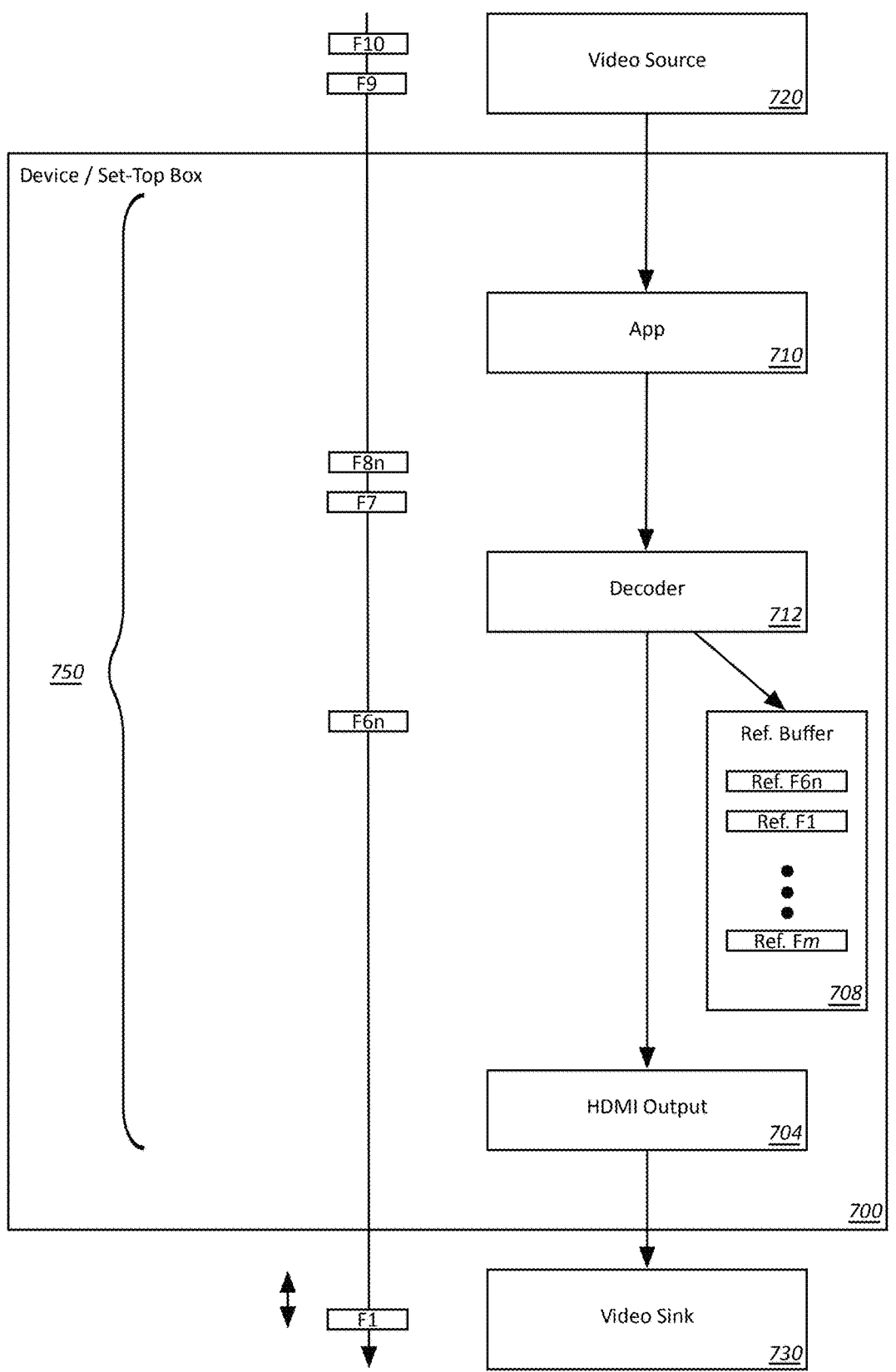
FIG. 7 is a functional block diagram illustrating a device with a video pipeline having reduced latency in accordance with some embodiments.

In further embodiments, providing at least some of the video frames might comprise providing the plurality of decoded video frames using a single-frame display buffer. For low-latency applications, the IP* frame structure (in which an I-Frame is followed by a specified number of P-frames, such as IPPP, or IPPPPPPPP) often is used for compression, and the decoding and display order is the same. Low-delay B structures that also include B-Frames (IB*BBBB) can also be used while maintaining the same decoding and display order, although predicted blocks may reference two previous frames. In such applications, as noted above, the video sink 230 (e.g., display device) typically will have two buffers (such as described above and in FIG. 2 has storing F1 and F2), which operate in "ping-pong" fashion. In accordance with certain embodiments, this ping-pong structure can be eliminated. Merely by way of example, For low-latency applications, it may be acceptable for the video sink to display the first X lines from frame Fm and the remaining lines from frame F(m+1) or F(m−1) without employing two buffers. For example, FIG. 7 illustrates a device 700 in which the ping-pong buffer has been eliminated, allowing frame F5 to be dropped, saving another frame of latency. In some embodiments, as FIG. 7 also shows, the input buffer can be eliminated in the video sink 720 as well, and frame F2 can be dropped.

It will be appreciated that eliminating the one of the display buffers at the video sink 720 can result in frame tearing, in which a portion of displayed image appears to be horizontally split from another portion of the displayed image. In some use cases (such as in gaming), this can be acceptable, and the method 500 accordingly comprises, in some embodiments, allowing frame tearing when displaying the plurality of decoded video frames (block 512). In an aspect, of some embodiments, the device 700 might selectively allow frame tearing based on user input and/or on a characteristic of an application (e.g., a particular game in which frame tearing is not disruptive), at the video sink 720, and methods in accordance with such embodiments therefore can include determining that frame tearing should be allowed based on such factors.

In many cases, a video decoder might need to store multiple frames as a reference for future frames; in such cases, it can be important to avoid the data of the subsequent frame overwriting the data of the reference frame in a frame buffer. Conventionally, the same frame buffer is often used to feed frames to the output display queue and used as a reference buffer. With a display pipeline (such as the pipelines 750 and 850 of FIGS. 7 and 8, respectively), having a single video processing frame buffer (as in pipeline 750) or no video processing frame buffers (as in pipeline 850, discussed in further detail below) at the output of the decoder 712, the ability to store reference frames can be provided, in some embodiments, by having a separate reference buffer 708. In such embodiments, the decoder 712 can maintain separate frame queues for internal reference vs display. For example, each decoded frame data (e.g., F1, F6n) can be written to an independent reference queue 708 and to the display pipeline (e.g., the frame buffer at the output of the decoder, shown as storing frame F6n in FIG. 7) at the same time. Thus, in some embodiments, the method 500 comprises storing a plurality of reference frames in a reference buffer outside the video pipeline and separate from the display buffer of the video pipeline (block 512). Moreover, in some embodiments, the method 500 comprises generating a video frame from one or more of the reference frames stored in the reference buffer (block 514). This operation can be performed using techniques known in the art (for example generating a full frame from an I frame and a P frame) but using one or more frames stored in the reference buffer instead of frames stored in a frame buffer that is part of the video pipeline 750.

Figure 8:
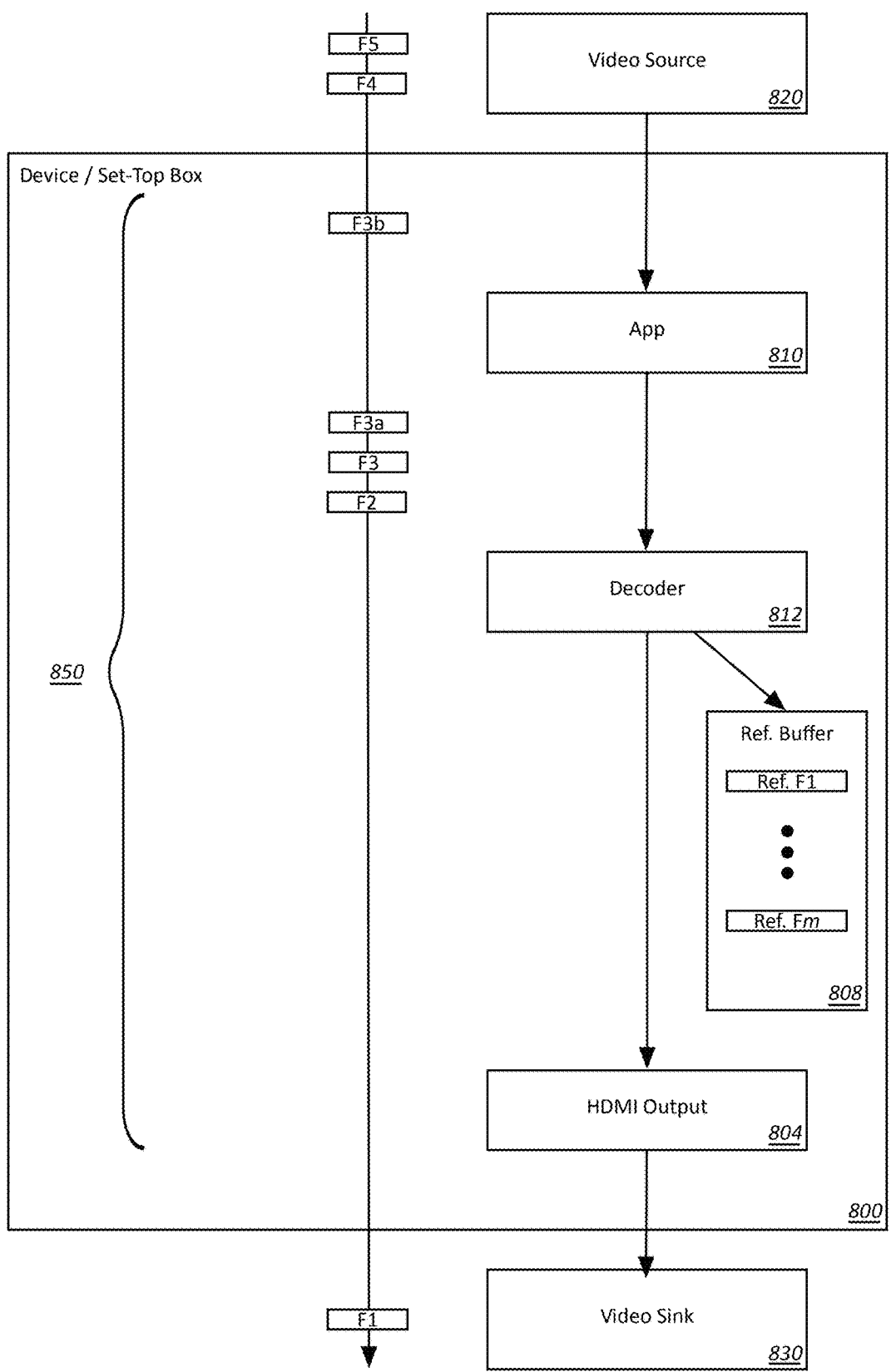
FIG. 8 is a functional block diagram illustrating a device with a video pipeline having reduced latency in accordance with some embodiments.

In further embodiments, as shown by FIG. 8, video processing frame buffers might be eliminated entirely from the video pipeline 850 while still providing the processed video frames via the HDMI interface 804. It will be appreciated that HDMI output to the video sink 830 often is required to have fixed data rate; for instance, a single frame's worth of data can be sent through the HDMI output 804 per time slice (e.g., as described in connection with FIG. 3). As noted previously, in some embodiments, the decoder 812 can process frames faster than this rate. In such embodiments, as the decoder starts decoding the frame, that frame can be routed to the HDMI output interface 704, which can control the pull rate from decoder 812 to match the output interface's transfer rate (e.g., one time slice). Thus, in some embodiments, the method 500 can comprise providing a decoded portion of an encoded video frame to the HDMI output interface 800 before an entirety of the encoded video frame is fully decoded (block 516). For instance, because decoders work on macroblock units (e.g., according to the MPEG-2, and H.264 standards) or other coding units (e.g., according to the H.265 and H.266 standards) of various sizes, such as 16×16 pixels, 128×128 pixels, etc., the decoder 812 can decode between approximately 16 and 128 lines at the same time. Accordingly, there can be up to approximately 128 lines available from the decoder 112 before the HDMI output 804 can start feeding the frame to the video sink 820, frame buffer latency in this case can be reduced to a maximum of 128 lines from the decoder 812. Thus, in some embodiments, the method 500 comprises providing a decoded portion of an encoded video frame to an output (e.g., the HDMI output of the device before an entirety of the encoded video frame is fully decoded (block 518). the decoded portion of the encoded video frame comprises one or more macroblock units or one or more coding units.

In some use cases (e.g., gaming, virtual reality, etc.) the entirety of a displayed image in a video stream might not change all the time; instead the majority of the displayed image might be largely static, and only a portion of the image needs to be added, e.g., to add or move a small feature, such as an enemy player in a game, some text, a pop-up message, etc. In such cases, latency can be reduced significantly by refreshing a small part of one or more video frames, rather than the entire frame. In such embodiments, a device in accordance with some embodiments can refresh a particular region, once the correct location for this region is determined, without requiring the refresh of entire frames.

In some embodiments, an encoder (which might be at the video source 120 or within the device 100) can encode a smaller resolution frame (referred to herein as a "partial video frame" or "partial frame") and deliver the encoded partial frame(s) to another device, a video sink, etc. more quickly than encoding and transmitting entire frame(s). In some cases, the partial frame might include a number of pixels extracted from a whole video frame. In some cases, the partial frame might include (or be accompanied by) metadata, such as position information indicating a position (e.g., coordinates of a location) of the partial frame within the full frame it should be used to update, an identification of that full frame, timing and/or synchronization information, etc.

Figure 9:
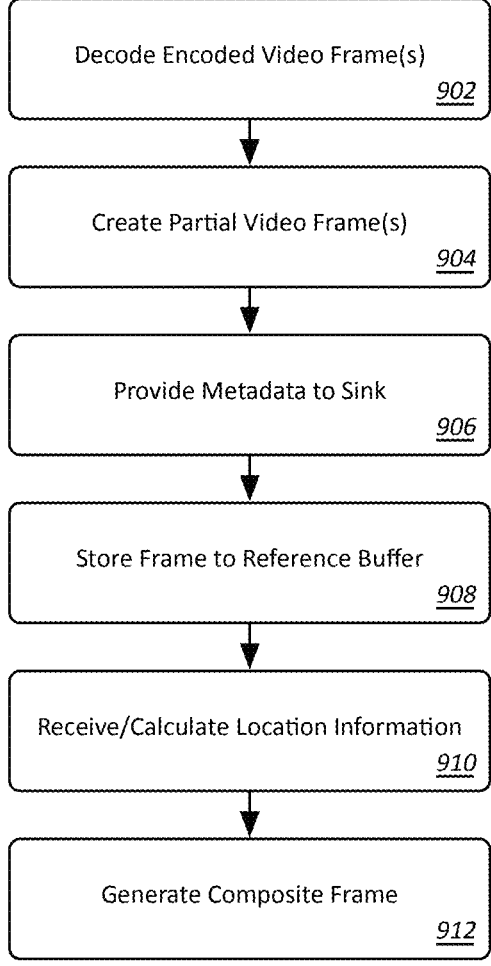
FIG. 9 is a flow diagram illustrating an exemplary method for reducing latency in a video pipeline in accordance with some embodiments.

Similarly, at a decoder, a partial frame often can be decoded more quickly, and thus processed and provided to the video sink more quickly, than a full frame. For example, if the partial frame is ½oth the size of the full frame, it can be decoded in roughly proportionally less time (e.g., 1 ms rather than 16 ms). Thus, in some embodiments, the plurality of of processed video frames produced by a device such as the device 100, and/or provided by the device to a video sink (e.g., at block 410 of FIG. 4), might comprise one or more processed partial video frames, and in such embodiments, such partial frames can be used to reduce the display latency of at least some of the video frames (e.g., at block 406 of FIG. 4). FIG. 9 illustrates a method 900 comprising various techniques for reducing display latency, for example, using partial video frames, which can be implemented, in some embodiments, complementary to techniques such as those described above and/or separate from such techniques.

Figure 10:
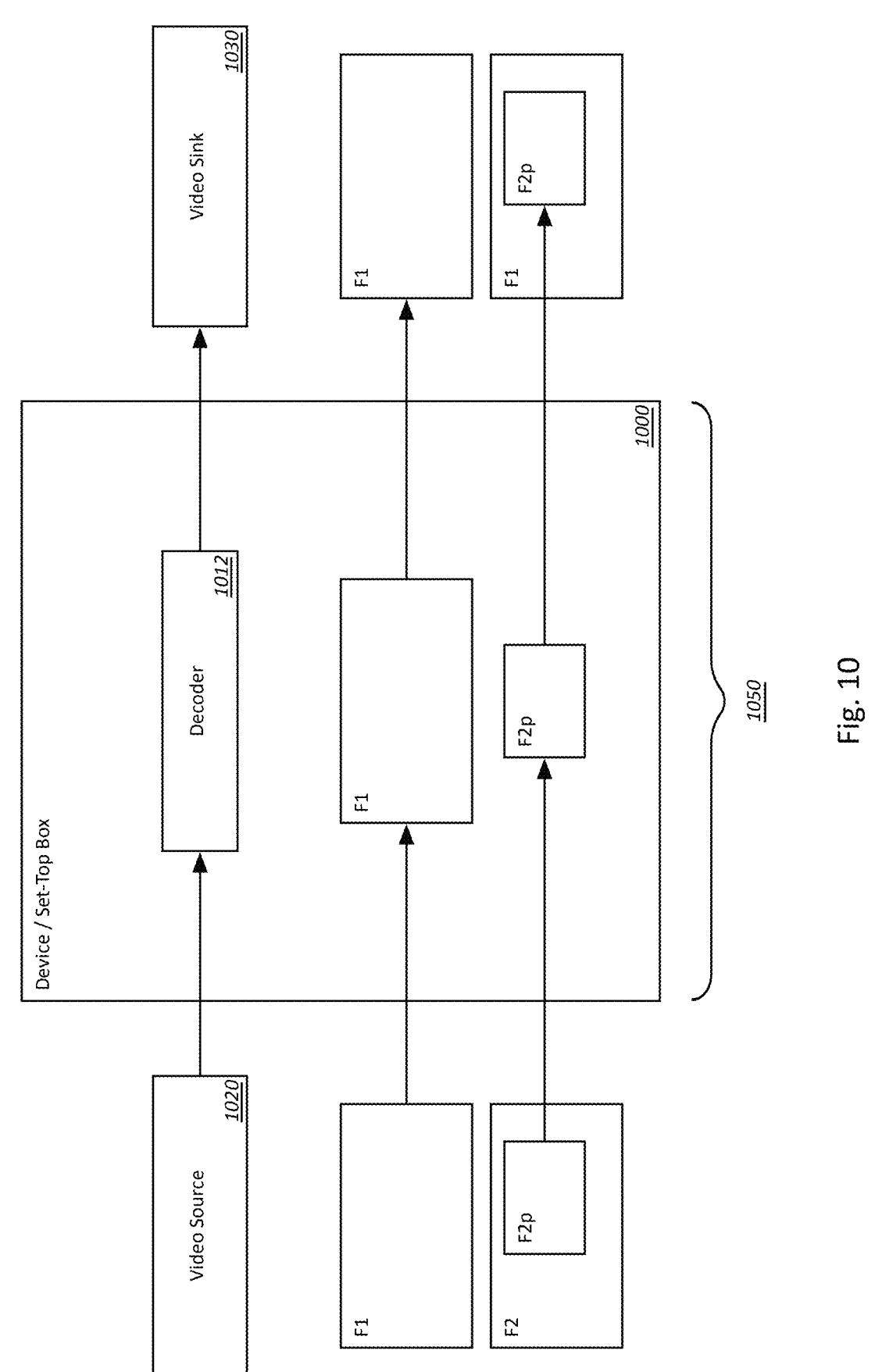
FIG. 10 is a functional block diagram illustrating a device comprising a video pipeline with reduced latency in accordance with some embodiments.
Figure 11:
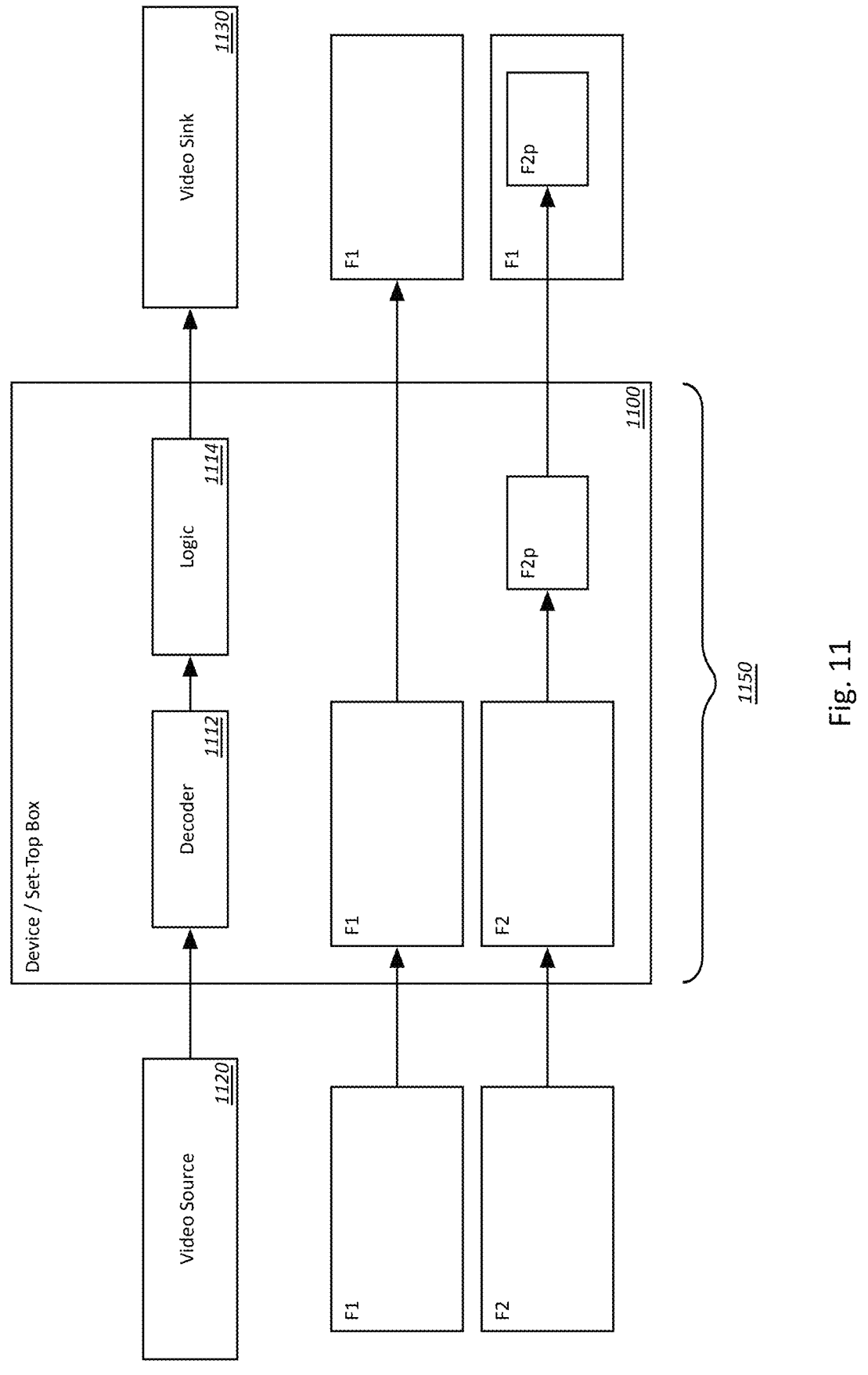
FIG. 11 is a functional block diagram illustrating a device comprising a video pipeline with reduced latency in accordance with some embodiments.

In some embodiments, processing the received frames can comprise decoding one or more of the received video frames, e.g., with a decoder or CODEC (block 902). In some cases, the encoded frames received from the video source might comprise one or more partial frames. An example of this use case is illustrated by FIG. 10, in which a device 1000 supports a video pipeline 1050 (which is shown in simplified form) including a decoder 1012. The video source 1120 encodes and transmits a first video frame F1, which is a full video frame (e.g., at a resolution of 1080p, 4K, etc.). The decoder 1012 decodes F1 and provides it to the video sink 1030 (e.g. via HDMI), where it is displayed. The next frame, F2 is largely the same image as F1, except that a portion F2p of the frame has changed. The video source 1020 encodes only F2p and provides it to the device 1100, where the decoder 1012 decodes it and provides the decoded partial frame F2p to the video sink (block 906). This arrangement can reduce the display latency of F1+2p compared to a situation in which the full F2 frame is decoded by the device 1000 and provided to the video sink 130. In some embodiments, as depicted by FIG. 11, the the method 900 might comprise creating (e.g., by the device 1100 or a component thereof, such as logic 1114) one or more partial video frames from a full frame received from the video source 1120 (block 904). This can be performed, e.g., by storing F1 in a reference buffer after decoding and then comparing the decoded F2 frame with F1 to determine only a portion of the frame has changed. In either case, when sending a partial frame to the video sink, the device can provide metadata such as that discussed above (e.g., using Supplemental Enhancement Information (SEI) messages) indicating that F2$p$ is a partial-frame update for F1 (i.e., to update F1 to F2), the location of F2$p$ within F2, and/or synchronization data to enable synchronizing the timing of the partial frame update (F2$p$) with the full frame (F1). Such metadata might be received from the video source 1020 (e.g., with F2$p$ in the embodiments illustrated by FIG. 10) and/or might be created by the device 1100 itself (e.g., in the embodiments illustrated by FIG. 11).

Figure 12:
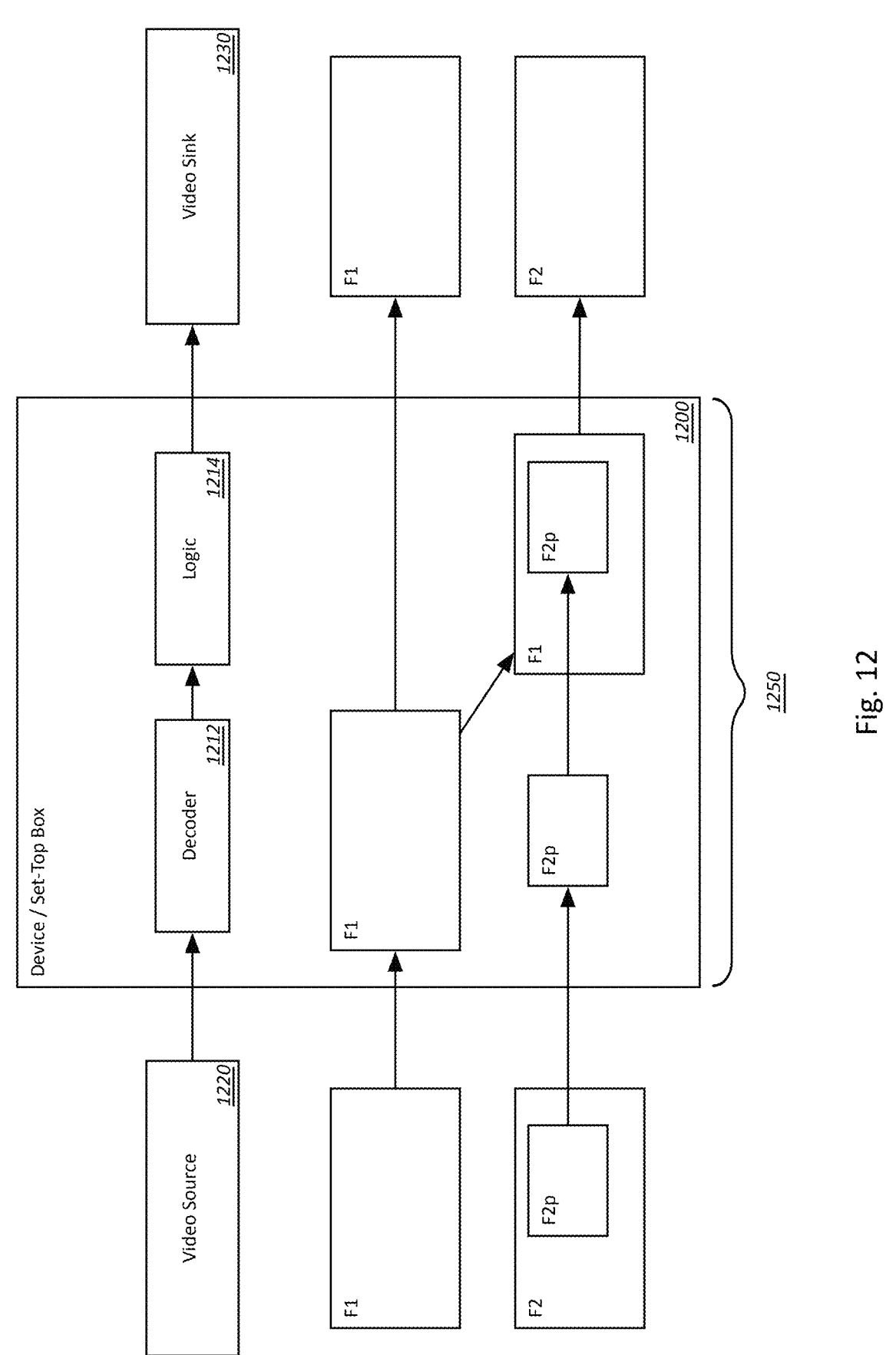
FIG. 12 is a functional block diagram illustrating a device comprising a video pipeline with reduced latency in accordance with some embodiments.

In some cases, the output interface of the device (e.g., an HDMI output interface) might not support providing partial frame updates, or the video sink might not be capable of displaying partial frame updates. In those cases, the method 900 can include producing a composite frame from one or more full video frames and/or partial video frames; this composite frame might be provided to the video sink, e.g., as a full frame update. FIG. 12 illustrates an example of such an embodiment. As in FIG. 10, the video source 1220 first encodes and transmits F1, which the device 1200 decodes and provides to the video sink 1230. In some embodiments, the device 1200 also stores F1 in a reference buffer (which is described above but for simplicity is not illustrated in FIG. 12) (block 908). The video source 1220 then encodes and sends F2$p$, which the device 1200 decodes. In some embodiments, the method comprises receiving metadata (including, e.g., location information about the relative location of F2$p$ in F1) from the video source (block 910). In other embodiments, the device might include logic to calculate the location of F2$p$ within F1 (e.g., based the metadata). Logic 1214 obtains F1 from the reference buffer and updates F1 with F2$p$ based at least in part on that metadata, generating a composite frame (F2) (block 912), which the device 1200 then provides to the video sink 1230.

Figure 13:
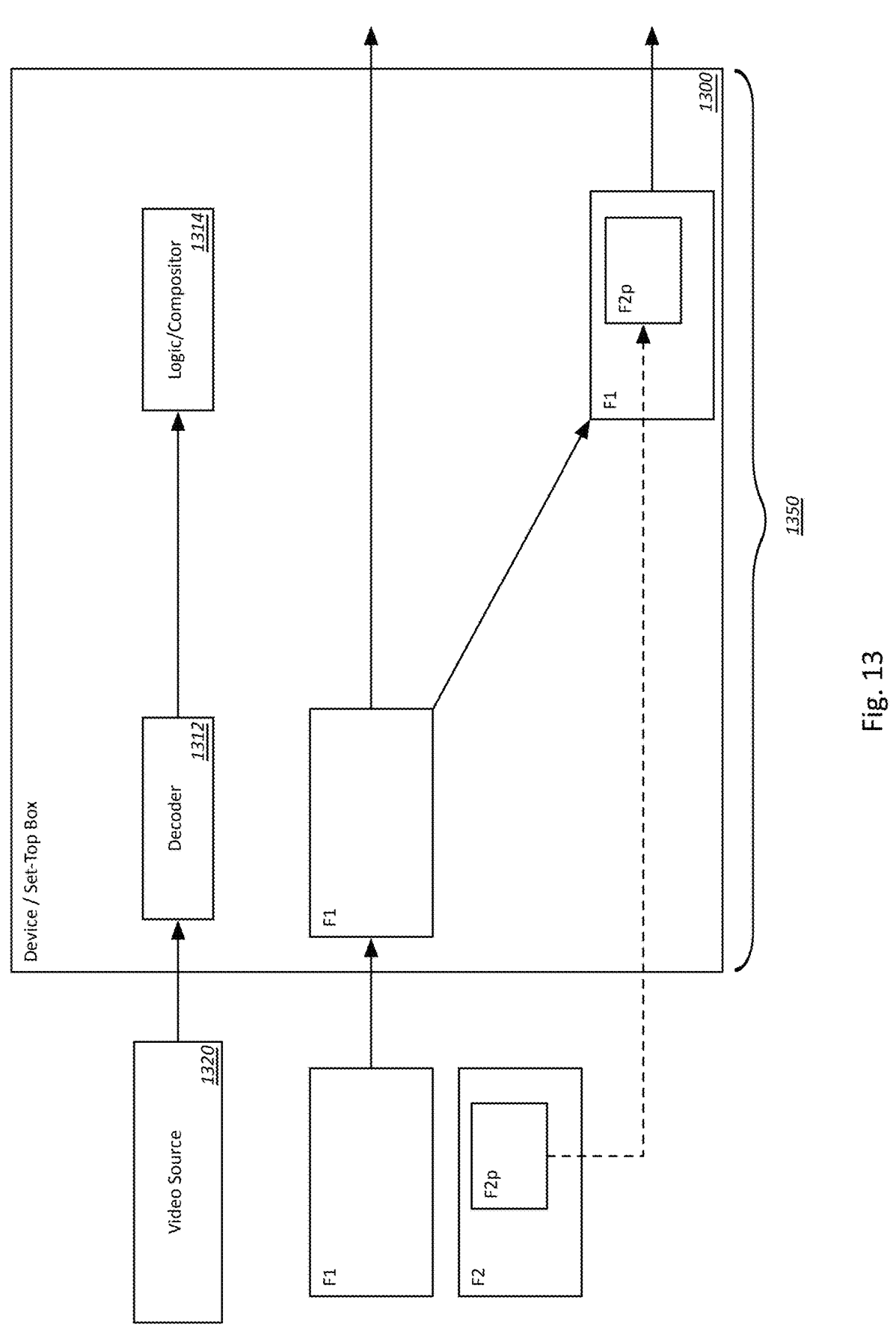
FIG. 13 is a functional block diagram illustrating a device comprising a video pipeline with reduced latency in accordance with some embodiments.

In some embodiments, the device might receive partial frame data via an independent graphics path. FIG. 13 illustrates an example of such embodiments, in which the video source encodes F2$p$ as a graphic and provides it via a graphics path e.g., a separate network connection, route, etc., that is independent of path of F1 and/or otherwise is not part of the same stream as F1. The logic 1314 (e.g., a compositor) in the device 1300 mixes the graphic (F2$p$) and the video frame, which, as noted above might be provided to the video sink (not shown on FIG. 13) and stored in a reference buffer (not shown on FIG. 13) to produce the composite frame, which is also provided to the video sink. In some embodiments, text and/or graphical elements can be pre-generated and stored in the device 1300, in which case, the video source might send only metadata, such as updates to location and/or timing information about the text and/or graphics, which can allow the logic 1314 to produce a composite frame, at the appropriate location in the video stream, from a prior frame, the stored graphical/text elements, and the location information.

In some embodiments, partial frames may be encoded using adaptive resolution coding tools, such as reference frame resampling supported by, e.g., H.265. With such tools, sequential frames of a video sequence do not need to have the same size, and prediction between reference frames of different sizes is possible. Thus, in the embodiments exemplified by, e.g., FIG. 10-13, F1 might be a reference frame, while F2$p$ might be encoded at a smaller resolution, and predicted (e.g., using inter-frame coding/motion compensation) from the corresponding (smaller) region of the previous frame F1. Conversely, if F2 is sufficiently changed from F1, intra-frame coding might be used instead (without any prediction from F1).

Figure 14:
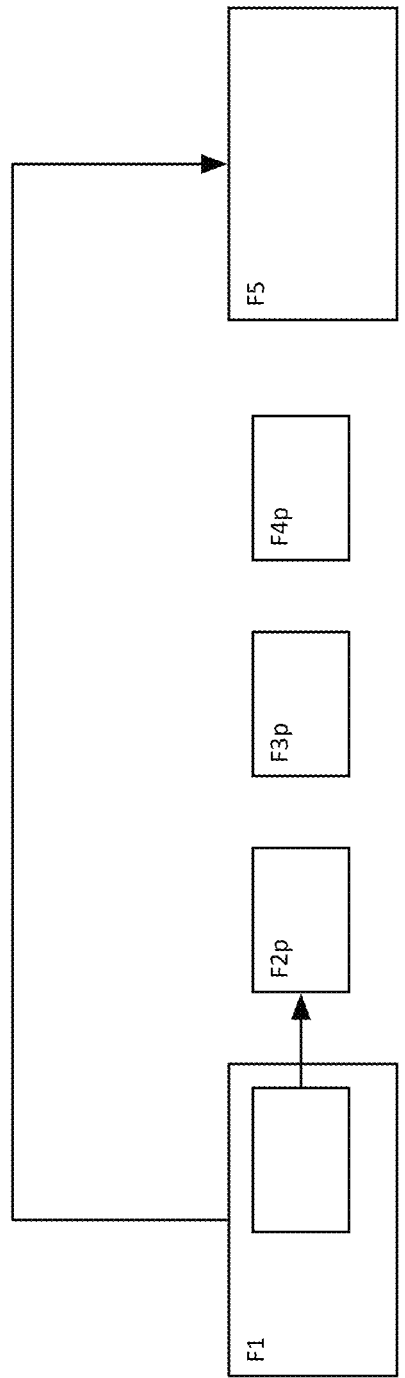
FIG. 14 illustrates a technique of generating a video frame from a reference frame in accordance with some embodiments.

In some embodiments, partial frame updates can be performed sequentially in the manner above (e.g., as shown by F3$p$, F4$p$, etc. in FIG. 14) until any latency-critical events have passed, when a full-frame update might be appropriate. By using multiple reference frames and keeping at least one full-size frame (frame F1) within the decoder's reference frame storage, the subsequent full frame (e.g., F5) can be encoded efficiently using inter-frame/motion compensation, and that frame F5 can be decoded using F1 to produce a second decoded full frame, without having to restart the decoder completely (e.g., without starting from an I-frame again). As noted above, in some embodiments, metadata (e.g., SEI messages) might be sent with each such frame to indicate that this was being done, and indicate where the decoder is supposed to display/overlay this smaller frame.

Figure 15:
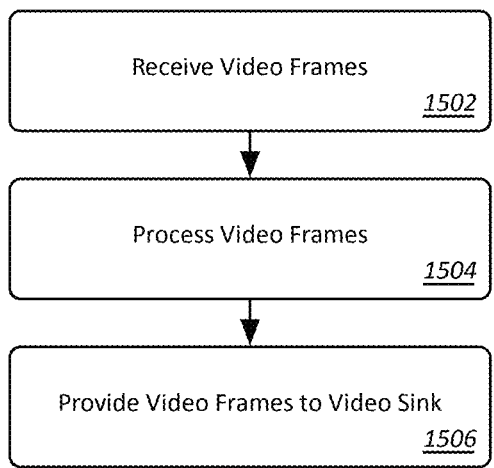
FIG. 15 is a flow diagram illustrating an exemplary method for reducing latency in a video pipeline in accordance with some embodiments.
Figure 15:

FIG. 15 illustrates a method 1500, operations of which can be performed by a device such as the device 100 described above, comprising several techniques for reducing display latency, for example, by decoupling a frame rate of the video frames received from the video source 120 from the frame rate of the video frames provided to the video sink 130. Merely by way of example, receiving a plurality of video frames might comprise receiving a plurality of sub-frames from the video source 120. In some cases, the device 100 might receive each of the sub-frames as a separate stream. In some cases, the device 100 might receive a plurality of sub-frames as a single stream. In some embodiments, receiving a plurality of video frames might comprise receiving a full video frame.

The method 1500 might comprise receiving, e.g., at a device such as the device 100, a plurality of video frames at a fixed frame rate (block 1202). In some aspects, the video frames can be received from a video source, such as the video source 120. At block 1504, the method 1500 comprises processing at least some of the plurality of video frames to produce a plurality of processed video frames. In some embodiments, processing the video frames can decouple the fixed frame rate of the received video frames from a flexible frame rate of the processed video frames, e.g., using various techniques described below in connection with FIG. 16 and elsewhere herein. The term "decouple," as used herein, can include any technique that changes the frame rate of the video stream provided to the video sink from the frame rate of the video stream received from the video source; the frame rate of the received stream can be fixed or variable, and the video stream provided to the video sink likewise can be fixed or variable. At block 1506, the method 1500 comprises providing each of the plurality of processed video frames to a video sink at the flexible frame rate. In some embodiments, providing the video frames to the video sink might comprise providing a first set of the plurality of decoded video frames to the video sink via dedicated multimedia interface and providing a second set of the plurality of decoded video frames to the video sink via local area network.

In accordance with various embodiments, processing the received video frames can comprise a number of operations, some of which are described in connection with FIG. 16. It should be appreciated that many of these operations can be performed independently of one another but can also be performed as part of the same process, e.g., within a single video pipeline.

Figure 16:
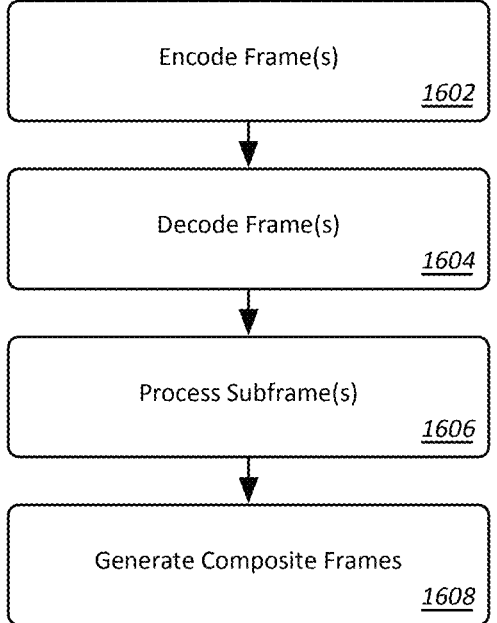
FIG. 16 is a flow diagram illustrating an exemplary method for reducing latency in a video pipeline in accordance with some embodiments.
Figure 16:

For example, FIG. 16 illustrates a method 1600 of processing video frames that can be used to decouple a flexible frame rate of the processed video frames from a fixed frame rate of the received frames. In some cases, the received video frames might not be encoded. Thus, at block 1602, the method 1600 can comprise encoding the at least some of the plurality of video frames with a CODEC (e.g., an MPEG CODEC, an H.26x CODEC, etc.) for transmission over a network. In some embodiments, the CODEC encodes the frames at a flexible frame rate. In other embodiments, the received video frames might have been encoded by a video CODEC at a fixed frame rate. The method 1600 therefore might comprise decoding at least some of the plurality of video frames to produce a plurality of decoded video frames (block 1604).

More particularly, in some cases, one or more of the received video frames might comprise a plurality of subframes. In a particular aspect, FIG. 17 illustrates a video frame F1 comprising a plurality of subframes SF1-SF16, which will be used in the discussion of various examples below. (It should be appreciated that a full frame can be divided into any number of subframes in accordance with various embodiments (e.g., two subframes, four subframes, eight subframes, 32 or 64 subframes, etc.) and that subframes can be, but need not be equal (or roughly equal) in data size, resolution, proportion of the full frame, etc. In some embodiments, the device might receive a full frame and divide the full frame into subframes for processing (e.g., decoding, etc.). In other cases, the device might receive each of the subframes individually, for example as part of a single stream of frames or as parts of multiple streams. Merely by way of example, the subframes SF1-SF16 of frame F1 of FIG. 17 might be received in a single stream as a set of sequential subframes in that order (or another order), might be received as separate streams each comprising some subset of the subframes (e.g., a first stream with SF1, SF5, SF9, SF13 . . . , a second stream with SF2, SF6, SF10, SF14, . . . , etc.), and/or might be received as parts of separate streams (e.g., a first stream with SF1, a second stream with SF2, . . . a fifth stream with SF5 . . . , etc.). In any case, the method 1600 can comprise processing at least some of the sub-frames of the encoded video frame (block 1606), and such processing operations can comprise any of the video pipeline operations described herein (including without limitation decoding the subframes, e.g., as discussed in further detail below).

In some cases, the device might process fewer than all of the sub-frames of the encoded video frame. For instance, the device 100 might process only SF1, SF2, SF5, and SF6 while disregarding (or discarding) the remaining subframes. (In some aspects, this technique can be used to decode partial video frames, for example as described above.) In such cases, the device 100 might provide only the processed subframes, or even some subset of one or more of the processed subframes, to the video sink. In particular embodiments, the device 100 might provide each of the processed subframes as part of a different video stream and/or might provide all (or some subset) of the processed subframes as part of the same video stream. This can provide a great deal of flexibility in delivering the video frames to the video sink 130.

In some cases, a full frame might be considered a decode canvas, in that the entire frame is received and decided by the device 100. A portion of the frame might be considered a display canvas, in that the portion of the frame is what is provided to the display sink. In some embodiments, the display canvas can move about the decode canvas from frame to frame. Although such embodiment are not limited to the subframe context, FIG. 17 provides a useful illustration for discussion of this feature. For example, a display canvas of one frame might comprise SF1, SF2, SF5, and SF6, and for that frame, only those subframes will be delivered to the video sink 130. In the next frame, however, the display canvas might comprise SF3, SF4, SF7, and SF8, and only those subframes will be delivered to the video sink 130. (Of course, the display canvas can also remain constant for subsequent frames as well.)

Figure 18:
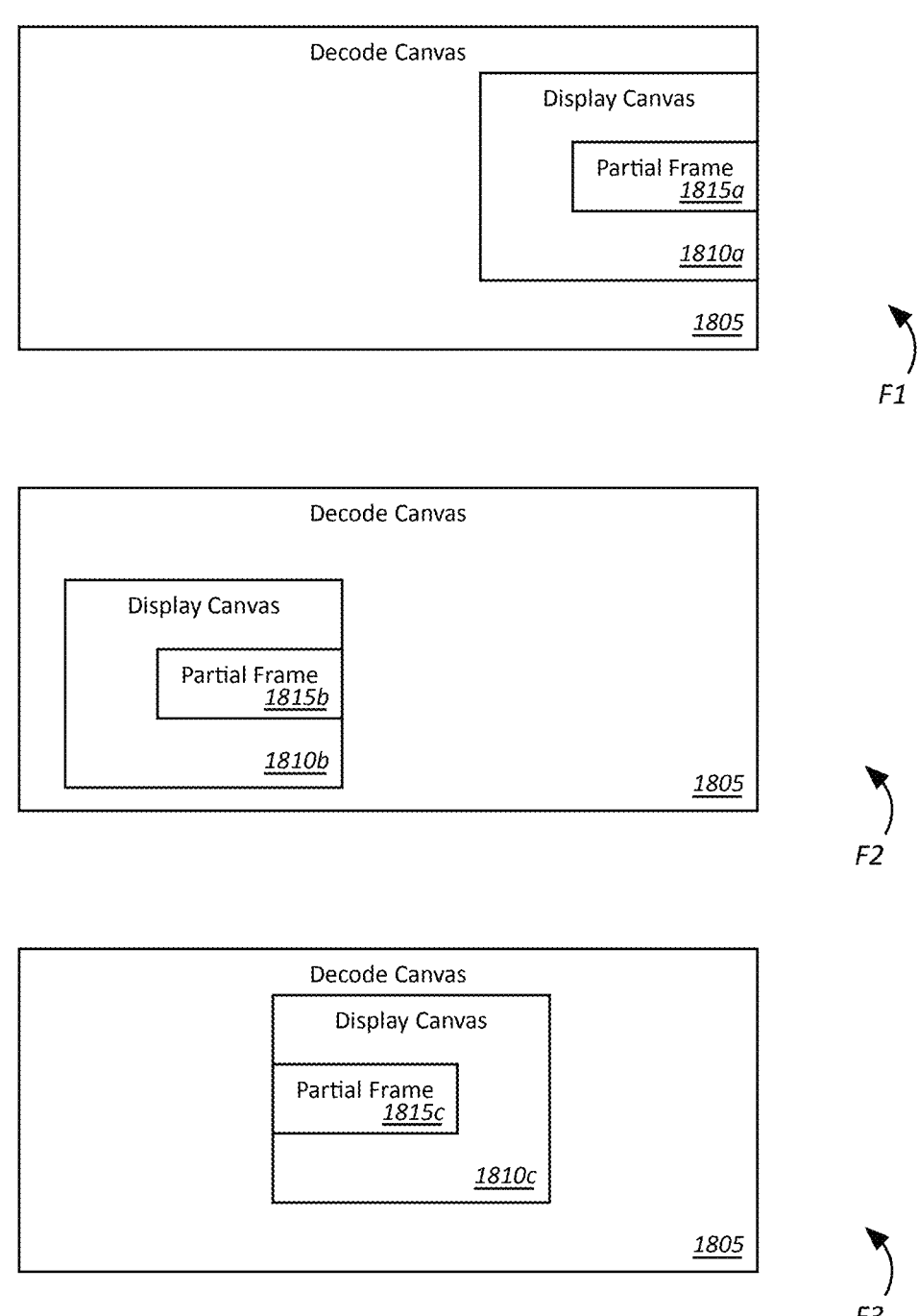
FIG. 18 illustrates a frame having a decode canvas and a display canvas.

FIG. 18 illustrates a similar principle, in which a first frame F1 comprises a decode canvas 1805 and a display canvas 1810*a*, which occupies a portion of the decode canvas. The display canvas 1810*a* might include a partial frame 1815*a*, which can be a portion of the display canvas 1810*a*. In the next frame F2, the display canvas 1810*b* has moved and now occupies a second portion of the decode canvas, and there might (or might not) be a partial frame 1815*b*, which can occupy the same or a different portion of the display canvas 1810*b*. Similarly, in frame F3, the display canvas 1810*c* might occupy the same or, as illustrated, different portion, of the decode canvas 1805, and a partial frame 1815*c* (if any) might occupy the same or different potion of the display canvas 1810*c*. (In some embodiments, groups of subframes, as in FIG. 17, can be considered to be a display canvas, and subgroups of subframes, or even a single subframe, might be considered to be a partial frame.)

This allows, in some circumstances, the full frame (the decode canvas) to be transmitted by the video source 120 at a relatively slower frame rate (perhaps 10-20 fps), while the display canvas is processed and delivered to the video sink at a much faster rate (perhaps 60-120 fps). In some embodiments, the partial frame can be processed and delivered to the sink at a faster rate, e.g., the fastest rate supported by the hardware. This can be particularly useful where some portions of the decode canvas are more dynamic (i.e., have more inter-frame changes) than others, enabling processing and transmission resources to be concentrated where most helpful. And as different portions of the decode canvas become more dynamic, the display canvas (and/or the partial frame) x can be moved around the decode canvas to provide a higher frame rate for the portion(s) of the decode canvas that are more dynamic at any particular point(s) in the stream.

Figure 19:
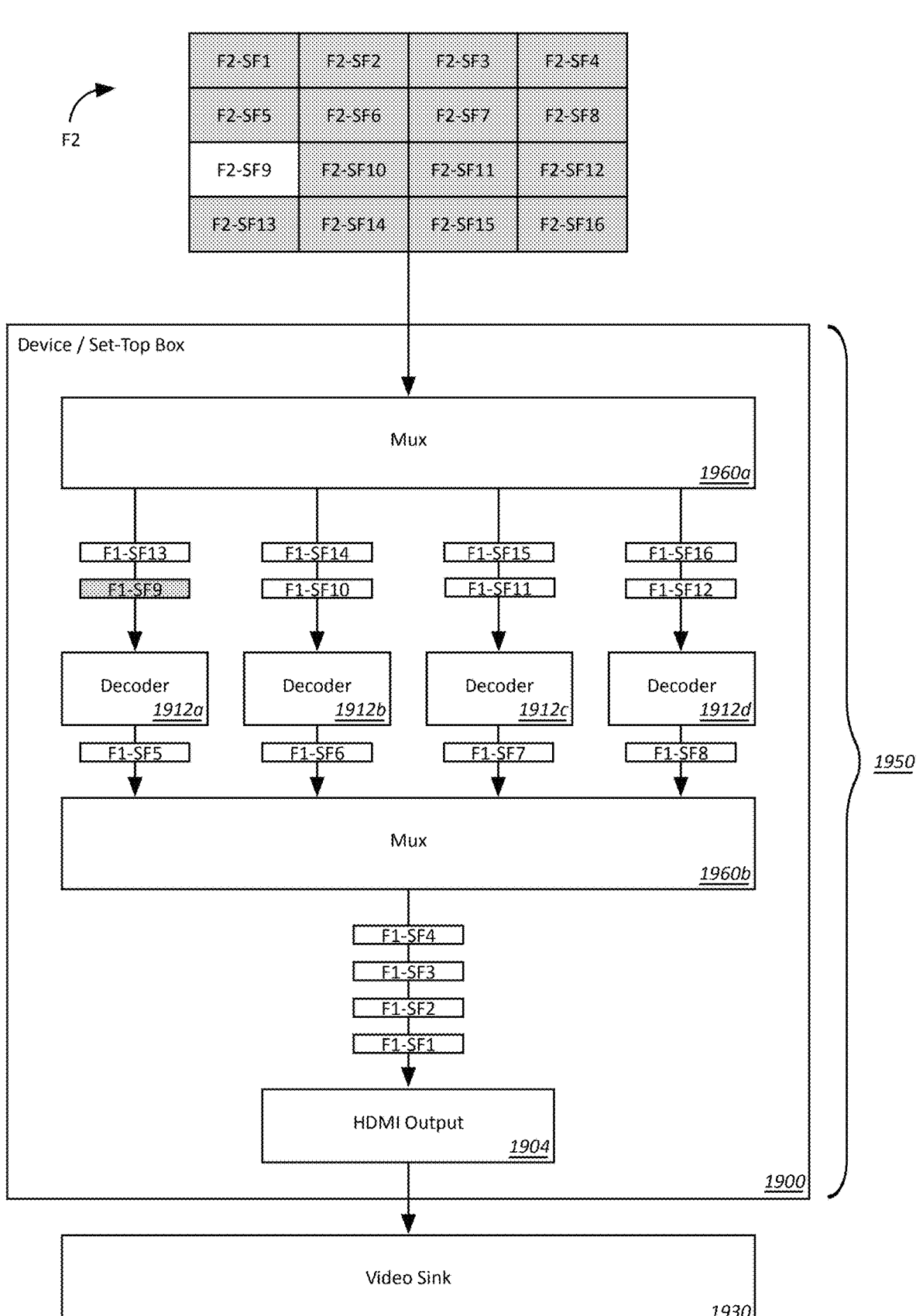
FIG. 19 is a functional block diagram illustrating a device comprising a video pipeline with reduced latency in accordance with some embodiments.

Different streams can be delivered in different ways, such as one stream being provided by HDMI and another by LAN/WLAN connection, for example. To illustrate some examples of delivering subframes in various combination of streams, FIG. 19 illustrates a device 1900 in which subframes (designated F1-SF1 through F1-SF16) of a first frame F1 are processed in a video pipeline 1950 (which is simplified in FIG. 18 for illustrative purposes but could comprise a variety of other processing stages, including without limitation those described elsewhere herein) with four decoders 1912 that process subframes in parallel. As shown, a first decoder 1912*a* decodes subframes F1-SF1, F1-SF5, F1-SF9, and F1-SF-13, while the other decoders 1912*b*-1912*d* process, in parallel with decoder 1912*a*, the other subframes of F1 is similar fashion as shown. In FIG. 18, the device 1900 (and video pipeline 1950) also includes two multiplexer/demultiplexers 1960, which can be used to distribute the subframes of F1 to the decoders 1912 and aggregate the decoded subframes for output, e.g., through the HDMI interface 1904, to deliver the subframes to the video sink 1930 as part of a single stream. When the next frame F2 is received, the subframes F2-SF1 through F2-SF16 can be processed in a similar fashion. (The multiplexer/demultiplexers 1960 are exemplary in nature for illustrative purposes, and any suitable type of hardware, firmware, and/or software logic can be used to perform the distribution/aggregation functionality.) Thus, the single stream provided by the device 1900 might comprise F1-SF1, F1-SF2 . . . . F2-SF15, F2-SF16, . . . . Such multiplexing and/or demultiplexing operations can be considered aspects of processing a video frame, as that term is used herein.

Further, if one or more of the subframes (e.g., SF9) is unchanged between F1 and F2, the device 1900 might not decode, process and/or transmit F2-SF9 to the video sink 1930, allowing the video sink 1930 to continue to display F1-SF2 while displaying F2SF1-8 and F2SF10-16. Likewise, if SF 9 is the only frame that changed between F1 and F2, that might be the only subframe of F2 that is transmitted to, and displayed by, the video sink 1930. This technique can be used to limit the processing and/or transmission of any subset of SF1-SF16 at each frame of the stream. This can reduce latency by reducing processing time in the device 1900 and/or video sink 1930. This technique can be used to redisplay any or all of the subframes that remain unchanged between consecutive frames (or non-consecutive frames, e.g., in cases in which buffered frames are dropped). In this way, each subframe might have a different frame rate, depending on when, and/or how often, each subframe changes in each frame of the stream transmitted to the video sink 1930.

Figure 20:
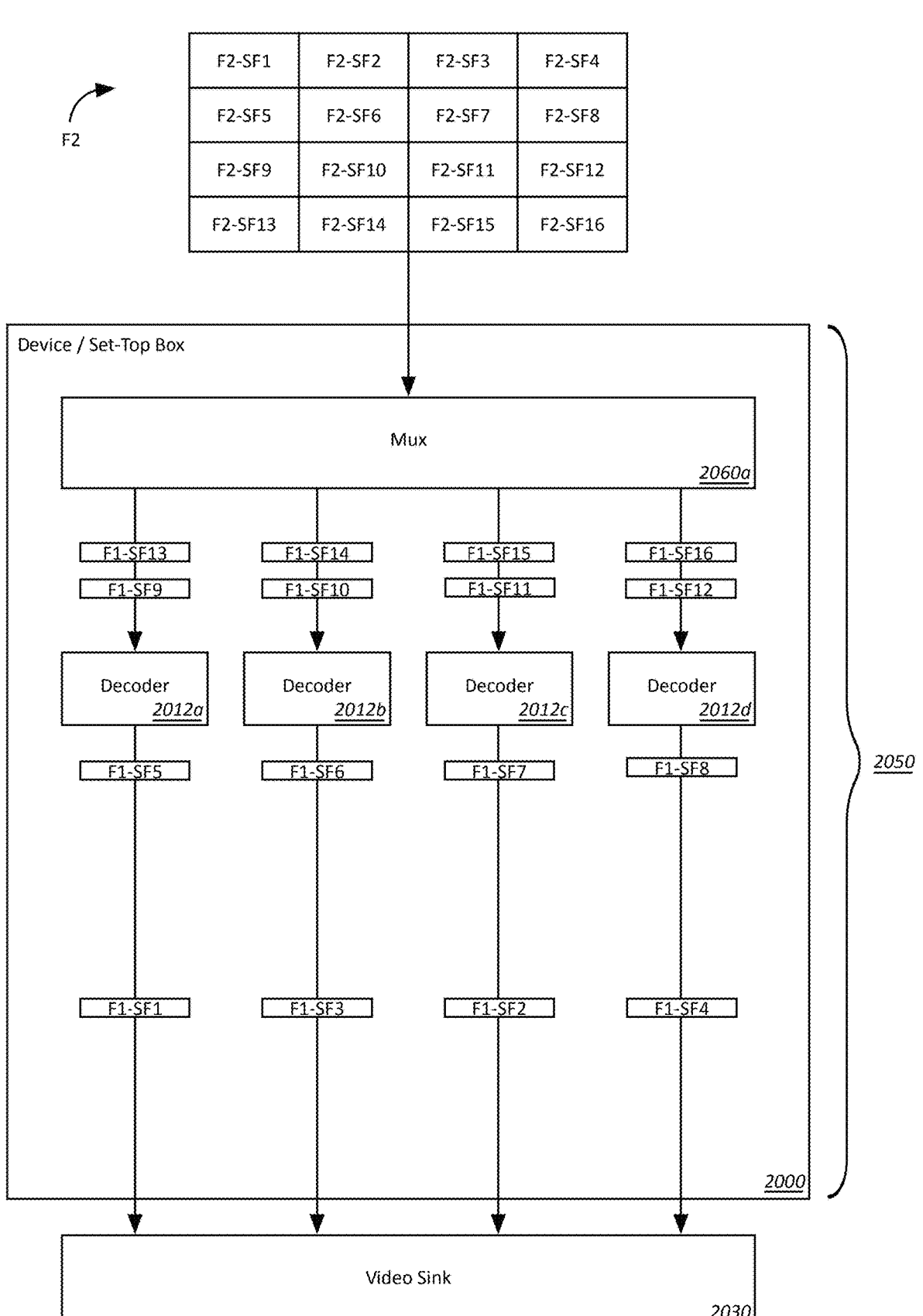
FIG. 20 is a functional block diagram illustrating a device comprising a video pipeline with reduced latency in accordance with some embodiments.

FIG. 20 illustrates an exemplary device 2000 that operates in similar fashion, except that the subframes output from each decoder are delivered to the video sink 2030 as separate streams; in other words, the device 2000 would output 4 separate streams, each having a subframe of consecutive (or non-consecutive) frames, such as a first stream with F1-SF1, F1-SF5, . . . . F2-SF9, F2-SF13, . . . , etc., a second stream with. The streams can be output using any suitable technique or combination of techniques, such as one or more HDMI connections, LAN/WLAN connections, etc. For instance, one stream might be provided to the video sink 130 by a first HDMI connection, while a second stream is provided by a second HDMI connection and the third and fourth streams are delivered by WLAN. A skilled artisan will appreciate based on this disclosure than any combination of delivery techniques can be employed in different embodiments. In some cases, a suitable multimedia interface (such as a multi-stream HDMI connection) might be used.

Figure 21:
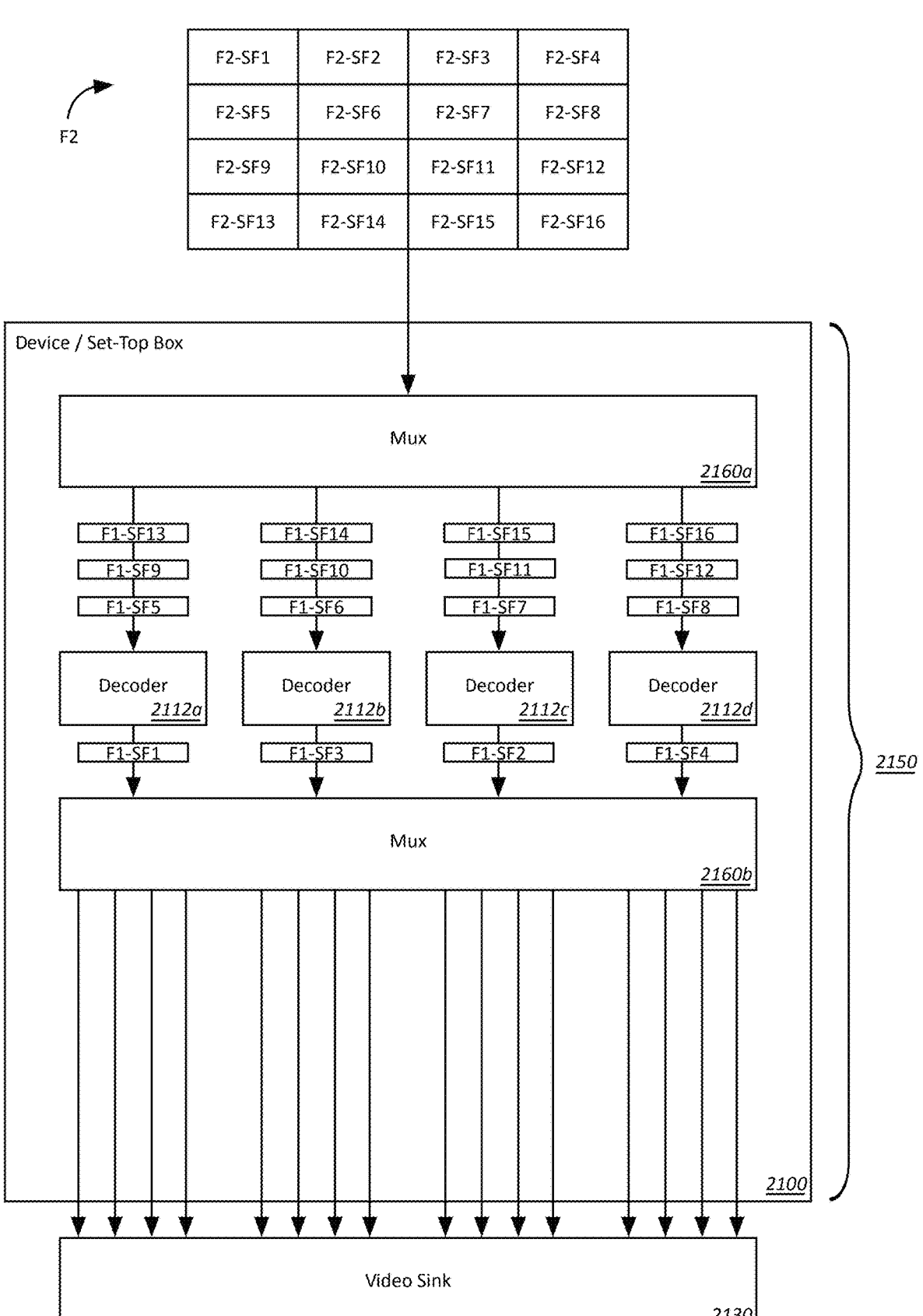
FIG. 21 is a functional block diagram illustrating a device comprising a video pipeline with reduced latency in accordance with some embodiments.

In some embodiments, each subframe might be delivered as a separate stream. FIG. 21 illustrates another exemplary device 2100. In this device 2100, the four decoders 2112 provide output to a multiplexer/demultiplexer 2160b that delivers 16 streams (corresponding to F1-SF1 through F1-SF16) as parts of 16 separate streams to the video sink 2130, for example F1-SF1, F2-SF1, . . . . From these examples, one should appreciate that any number of decoders can be used to provide parallel decoding in accordance with different embodiments. In some cases, a single decoder might be able to decode multiple subframes in parallel. Similarly, while these examples depict a frame with 16 subframes, it should be appreciated that different embodiments can support any number of subframes. Likewise, various embodiments can provide any number of streams as output to a video sink.

In some cases, the method can comprise producing a composite frame (e.g., F1 of FIG. 17) comprising some or all of the subframes of that frame (e.g., SF1-SF16 of FIG. 17), (block 1608) regardless of whether the device 100 received the frame as a set of subframes or received the frame as a full frame and thereafter divided the frame into subframes. In some embodiments, the device 100 can comprise dedicated logic 114 and/or an app 110 to divide a frame into subframes and/or to produce a composite full frame from some or all of the subframes. Such division and composition operations can be considered aspects of processing a frame, as that term is used herein. In some embodiments, the composite frame might be, instead of a full frame, a partial frame that can be used to update a prior full frame, e.g., as described in further detail above.

As noted above, in some embodiments, the device 100 can process frames more quickly than a typical fixed display frame rate. This is particularly true for embodiments that decode and/or otherwise process subframes in parallel. Thus, if frames are received at a fixed frame rate of 60 fps, the device 100 might decode/process the subframes in a fraction of that time, perhaps 600 fps, with parallel pipelines for decoding and/or otherwise processing subframes. These frames can be provided to a video sink (e.g., using any of the techniques described herein) at the rate at which they are processed, in some cases without any post-processing buffering (e.g., using any of the techniques described herein).

While this disclosure provides many examples of devices (e.g., 100, 200, 600 . . . 2100) and video pipelines (e.g., 150, 250, 650 . . . 2150), it should be understood that various embodiments can combine the features of any or all of these devices, and in some aspects, all of the devices and pipelines can be considered to be illustrating different functionalities of the same embodiment. Likewise, while many operations are described in connection with the methods 400, 500, 900, 1500, and 1600, any and/or those operations can be combined in various embodiments, and in some aspects, all of those operations can be considered to be combined into a single method in a particular embodiment.

Exemplary Device

Figure 22:
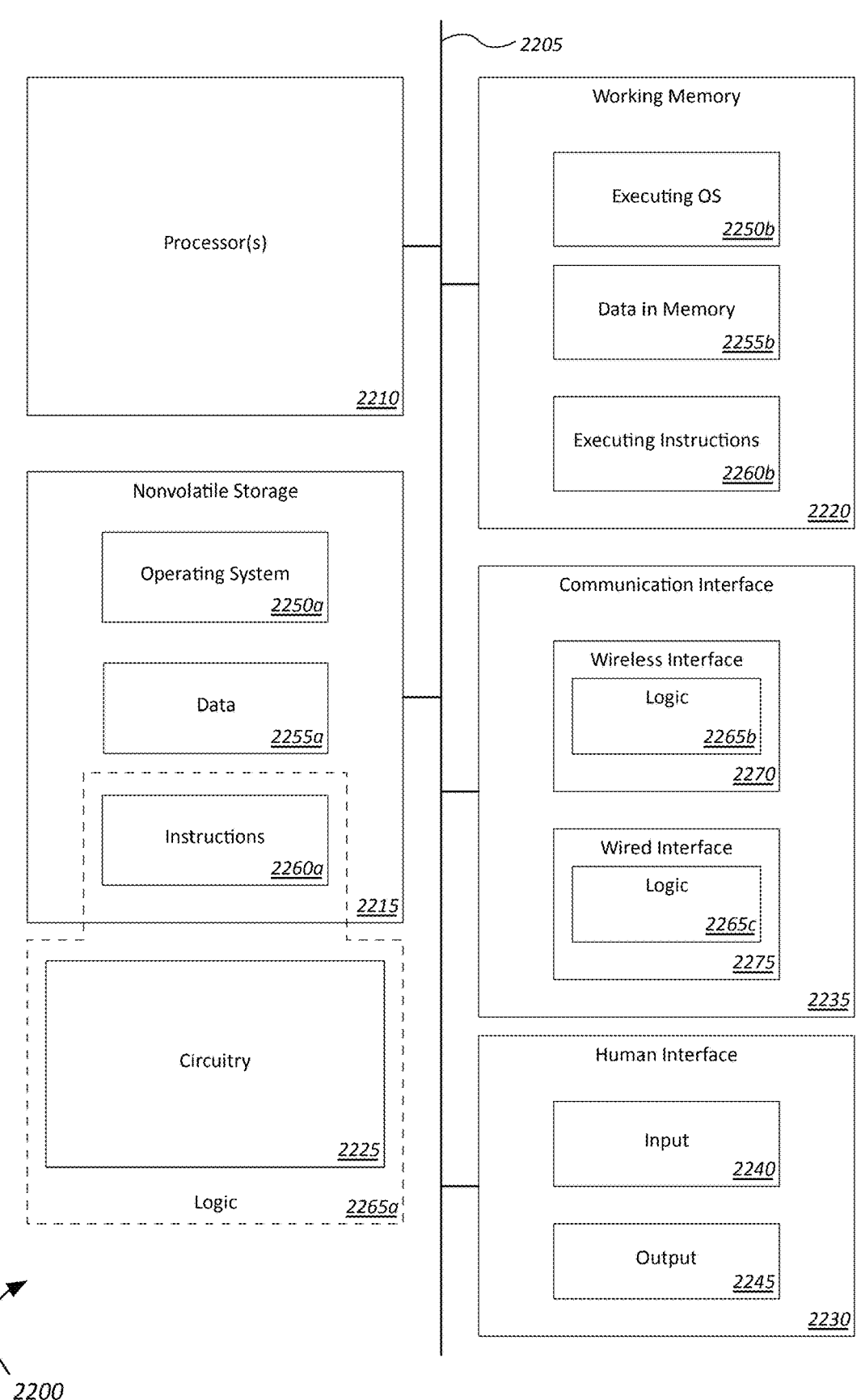
FIG. 22 is a block diagram illustrating example components of a device in accordance with some embodiments.

FIG. 22 is a block diagram illustrating an example of a device 2200, which can function as a STB or any other device described above, including without limitation the devices 100, 200, 600 . . . 2100 described above, in accordance with embodiments, and/or can function to perform some or all operations of the methods described herein. No component shown in FIG. 22 should be considered necessary or required by each embodiment. For example, many embodiments may not include a processor and/or might be implemented entirely in hardware or firmware circuitry. Similarly, many embodiments may not include input devices, output devices, or network interfaces.

With that prelude, as shown in FIG. 22, the device 2200 may include a bus 2205. The bus 2205 can include one or more components that enable wired and/or wireless communication among the components of the device 2200. The bus 2205 can couple together two or more components of FIG. 10, such as via operative coupling, communicative coupling, electronic coupling, and/or electric coupling. Such components can include a processor 2210, nonvolatile storage 2215, working memory (e.g., system dynamic random-access memory (DRAM)) 2220, and/or circuitry 2225. In some cases, the system 2200 can include human interface components 2230 and/or a communication interface 2235.

While these components are displayed as integrated within the device 2200, certain components might be located externally from the device 2200. As such, the device 2200 might include, instead of or in addition to the components themselves, facilities for communicating with such external devices, which therefore can be considered part of the device 2200 in some embodiments.

Merely by way of example, the nonvolatile storage 2215 can include a hard disk drive (HDD), a solid-state drive (SSD), and/or any other form of persistent storage (i.e., storage that does not require power to maintain the state of the stored data). While such storage often is incorporated within the device 2200 itself, such storage might be external to the device 2200 and can include external HDD, SSD, flash drives, or the like, as well as networked storage (e.g., shared storage on a file server, etc.), storage on a storage area network (SAN), cloud-based storage, and/or the like. Unless the context dictates otherwise, any such storage can be considered part of the device 2200 in accordance with various embodiments. In an aspect, the storage 2215 can be non-transitory.

Similarly, the human interface 2230 can include input components 2240 and/or output components 2245, which can be disposed within the device 2200, external to the device 2200, and/or combinations thereof. The input components 2240 can enable the device 2200 to receive input, such as user input and/or sensed input. For example, the input components 2240 may include a touch screen, a keyboard, a keypad, a mouse, a button, a microphone, a switch, a sensor, a global positioning system sensor, an accelerometer, a gyroscope, and/or an actuator. In some cases, such components can be external to the device 2200 and/or can communicate with components internal to the device 2200 such as input jacks, USB ports, Bluetooth radios, and/or the like. Similarly, the output component 2245 can enable the device 2200 to provide output, such as via a display, a printer, a speaker, and/or the like, any of which can be internal to the device 2200 and/or external to the device but in communication with internal components, such as a USB port, a Bluetooth radio, a video port, and/or the like. Again, unless the context dictates otherwise, any such components can be considered part of the device 2200 in accordance with various embodiments.

From these examples, it should be appreciated that various embodiments can support a variety of arrangements of external and/or internal components, all of which can be considered part of the device 2200.

In an aspect, the nonvolatile storage 2215 can be considered a non-transitory computer readable medium. In some embodiments, the nonvolatile storage 2215 can be used to store software and/or data for use by the device 2200. Such software/data can include an operating system 2250a, data 2255a, and/or instructions 2260a. The operating system can include instructions governing the basic operation of the device 2200 and can include a variety of personal computer or server operating systems, embedded operating systems, and/or the like, depending on the nature of the device 2200. The data 2255a can include any of a variety of data used or produced by the device 2200 (and/or the operation thereof), such as media content, databases, documents, and/or the like. The instructions 2260a can include software code, such as applications, object code, assembly, binary, etc. used to program the processor 2210 to perform operations in accordance with various embodiments. In an aspect, the operating system 2250a can be considered part of the instructions 2260a in some embodiments. Copies of the operating system 2250b, data 2255b, and/or instructions 2260b can be stored in the working memory 2220 and/or executed by one or more processors 2210.

The processor(s) 2210 can include one or more of a central processing unit, a graphics processing unit, a microprocessor, a controller, a microcontroller, a digital signal processor (DSP), programmable logic (such as a field-programmable gate array (FPGA) an erasable programmable logic device (EPLD), or the like), an application-specific integrated circuit (ASIC), a system on a chip (SoC) and/or another type of processing component. Each of the processor(s) 2210 can be implemented in hardware, firmware, or a combination of hardware, firmware and/or software. In some implementations, the processor(s) 2210 includes one or more processors capable of being programmed to perform one or more operations or processes described elsewhere herein.

For example, in some embodiments, the device 2200 can comprise logic 2265. In particular embodiments, the logic 2265 might include logic 2265a that can provide some functionality of the wireless 2200 overall. In other cases various other components might comprise logic of their own, for example, as described in further detail below.

Such logic can be any sort of code, instructions, circuitry, or the like that can cause the device 2200 (or various subsystems or interfaces thereof) to operate in accordance with the embodiments herein (e.g., to perform some or all of the processes and/or operations described herein). Merely by way of example, the logic 2265 can include the instructions 2260, which might be stored on the nonvolatile storage 2215 as noted above, loaded into working memory 2220, and/or executed by the processor 2210 to perform operations and methods in accordance with various embodiments. In an aspect, these instructions 2260 can be considered to be programming the processor 2210 to operate according to such embodiments. In the same way, the operating system 2250 (to the extent it is discrete from the instructions 2260) might be stored on the nonvolatile storage 2215, loaded into working memory 2220, and/or executed by a processor 2210.

Alternatively, and/or additionally, logic can include the circuitry 2225 (e.g., hardware or firmware), which can operate independently of, or collaboratively with, any processor 2210 the device 2200 might or might not have. (As noted above, in some cases, the circuitry 2250 itself can be considered a processor 2210.) The circuitry 2225 might be embodied by a chip, SoC, ASIC, programmable logic device (FPGA, EPLD, etc.), and/or the like. Thus, some or all of the logic enabling or causing the performance of some or all of the operations described herein might be encoded in hardware or firmware circuitry (e.g., circuitry 2250) and executed directly by such circuitry or a dedicated or embedded processor 2210, rather than being software instructions 2260 loaded into working memory 2220. (In some cases, the logic 2265 can include, and/or various functionality of the device 2200 can be performed by execution of, hardware instructions or dedicated circuitry.) Thus, unless the context dictates otherwise, embodiments described herein are not limited to any specific combination of hardware, firmware, and/or software.

The device 2200 can also include a communication interface 2235, which can include, without limitation, one or more wireless interfaces 2270, which can enable the device to communicate with other devices wirelessly and/or over radio frequencies (RF), and/or one or more wired interfaces 2275. Which can enable the device 10 to communicate with other devices via a wired (e.g., electrical and/or optical) connection. Wireless interfaces 2270 can include, without limitation, a Bluetooth interface, a Wi-Fi and/or WLAN interface, a 5G or cellular interface, a satellite interface, etc.). Such wireless interfaces 2270 and wired interfaces 2275 can include logic 2265b and 2265c, respectively, including without limitation logic similar to, or coexistent with, the logic 2265, and or processors similar to the processors 2210 described above.

In a particular embodiment, for example, a wireless interface 2270 or wired interface 2275 might include logic corresponding to various layers of the Open Systems Interconnection (OSI) model. For example, a the logic of a wireless interface, can include a PHY section as well as a MAC section, a radio, any necessary modems, antennas, ports, etc., and/or logic implementing any higher layers in the OSI model, to the extent any such layers are not implemented in the logic of the device 2200 itself. In some embodiments, this logic 2265*b*, 2265*c*, or the interfaces 2270, 2275 themselves, can be implemented in combination, as discrete chips, as SoCs, and/or the like. Depending on the nature of the device 2200, the communication interface 2235 (and/or the wireless and wired interfaces 2265, 2270) can include any standard or proprietary components to allow communication as described in accordance with various embodiments.

Various Aspects of Some Embodiments

In addition to the exemplary embodiments above, some embodiments can include any combination or sub-combination of the aspects discussed in the following examples. Moreover, some or all aspects of the embodiments described below can be combined with and/or implemented in the examples described above within the scope of the various embodiments. No single embodiment requires any particular combination of these aspects; by the same token, however, aspects described in different contexts should not necessarily be considered separate species or embodiments from one another.

One set of embodiments comprises set-top boxes.

In an aspect of some embodiments, an exemplary set-top box comprises an input interface to receive a plurality of video frames from a video source. In an aspect of some embodiments, the set-top box comprises a decoder to decode the plurality of video frames to produce a plurality of decoded video frames. In an aspect of some embodiments, the set-top box comprises an interface to provide the plurality of decoded video frames to a video sink. In an aspect of some embodiments, the set-top box comprises logic to reduce a display latency of each of the decoded video frames provided to the video sink by reducing a number of video frames stored in one or more frame buffers in a video pipeline of the set-top box.

In an aspect of some embodiments, another exemplary set-top box comprises an input interface to receive a plurality of video frames from a video source. In an aspect of some embodiments, the set-top box comprises a decoder to decode the plurality of video frames to produce a plurality of decoded video frames, the plurality of decoded video frames comprising one or more decoded partial video frames. In an aspect of some embodiments, the set-top box comprises an output interface to provide at least some of the plurality of decoded video frames to a video sink. In an aspect of some embodiments, the set-top box comprises a processor to reduce a display latency of the at least some of the plurality of decoded video frames provided to the video sink using the one or more decoded partial video frames.

In an aspect of some embodiments, another set-top box comprises an input interface configured to receive a plurality of video frames from a video source at a fixed frame rate, the plurality of received video frames comprising a video frame that comprises a first plurality of sub-frames. In an aspect of some embodiments, the set-top box comprises a processor configured to process at least some of the plurality of video frames to produce a plurality of processed video frames. In an aspect of some embodiments, processing at least some of the plurality of video frames comprises processing at least some of the first plurality of sub-frames. In an aspect of some embodiments, processing at least some of the plurality of the video frames decouples the fixed frame rate of the received video frames from a flexible frame rate of the processed video frames. In an aspect of some embodiments, the set-top box comprises an output interface configured to provide at least some of the processed video frames, including at least some of the plurality of processed sub-frames, to a video sink at the flexible frame rate.

Another set of embodiments provides devices.

In an aspect of some embodiments, a device comprises logic to receive a plurality of encoded video frames from a video source. In an aspect of some embodiments, the device comprises logic to process at least some of the plurality of encoded video frames. In an aspect of some embodiments, the device comprises logic to provide at least some of the processed video frames to a video sink. In an aspect of some embodiments, processing the plurality of video frames reduces a display latency of each of the video frames provided to the video sink by reducing a number of video frames stored in one or more frame buffers in a video pipeline associated with the device. In an aspect of some embodiments, the device further comprises logic to selectively disable the logic to reduce the display latency of the video frames provided to the video sink based on: an application associated with the video frames, configuration settings, and/or user controls.

In an aspect of some embodiments, the video pipeline comprises a plurality of video processing stages within the device and a plurality of frame buffers, the plurality of processing stages comprising a decoder, and the plurality of frame buffers comprising a video processing frame buffer and a display frame buffer.

In an aspect of some embodiments, processing the plurality of video frames comprises decoding at least some of the plurality of encoded video frames to produce a plurality of decoded video frames. In an aspect of some embodiments, the device comprises providing at least some of the processed video frames to the video sink comprises providing at least some of the decoded video frames to the video sink.

In an aspect of some embodiments, reducing the number of frames stored in one or more frame buffers in the video pipeline comprises identifying plurality of available decoded video frames in the video pipeline. In an aspect of some embodiments, reducing the number of frames stored in one or more frame buffers in the video pipeline comprises identifying a most recently-available decoded video frame. In an aspect of some embodiments, reducing the number of frames stored in one or more frame buffers in the video pipeline comprises providing the most recently-available decoded video frame to the video sink. In an aspect of some embodiments, reducing the number of frames stored in one or more frame buffers in the video pipeline comprises discarding a remainder of the plurality of available decoded video frames.

In an aspect of some embodiments, the received plurality of video frames are encoded at a fixed frame rate imposing an order on the video frames. In an aspect of some embodiments, providing the most-recently available decoded video frame to the video sink comprises providing the most recently-available decoded video frame out of order from the fixed frame rate.

In an aspect of some embodiments, reducing the number of frames stored in one or more buffers in the video pipeline comprises providing the plurality of decoded video frames to the video sink without storing any of the plurality of decoded video frames in the video processing frame buffer.

In an aspect of some embodiments, reducing a number of frames stored in one or more buffers in the video pipeline comprises providing the plurality of decoded video frames to the video sink while storing no more than a single frame in the frame display buffer.

In an aspect of some embodiments, providing the plurality of decoded video to the video sink comprises providing at least some of the plurality of decoded video frames to the video sink via a High-Definition Multimedia Interface (HDMI) connection.

In an aspect of some embodiments, providing the plurality of decoded frames to the video sink further comprises providing at least some of the plurality of decoded video frames to the video sink via an alternate connection separate from the HDMI connection.

In an aspect of some embodiments, reducing the number of frames stored in one or more buffers in the video pipeline further comprises storing a plurality of reference frames in a reference buffer outside the video pipeline and separate from a display buffer of the video pipeline.

In an aspect of some embodiments, the device comprises logic to generate a video frame from one or more of the reference frames stored in the reference buffer.

In an aspect of some embodiments, reducing the number of frames stored in one or more buffers in the video pipeline further comprises allowing frame tearing when displaying the plurality of decoded video frames. In an aspect of some embodiments, allowing frame tearing when displaying the plurality of decoded video frames comprises selectively allowing frame tearing based on user input or on a characteristic of an application displaying the plurality of video frames.

In an aspect of some embodiments, providing at least some of the processed video frames to the video sink comprises decoding at least some of the plurality of encoded video frames at a rate faster than a frame rate of the plurality of encoded video frames. In an aspect of some embodiments, providing at least some of the processed video frames to the video sink comprises providing a decoded portion of an encoded video frame to an output of the device before an entirety of the encoded video frame is fully decoded.

In an aspect of some embodiments, the decoded portion of the encoded video frame comprises one or more macroblock units or one or more coding units. In an aspect of some embodiments, providing the decoded portion of the encoded video frame to the output of the device reduces a display latency of the decoded portion of the encoded video frame to a number of lines specified by the one or more macrob-lock units or one or more coding units.

In an aspect of some embodiments, the device is a set-top box, a component of a set-top box, or a system on a chip (SoC). In an aspect of some embodiments, the device is a television.

In an aspect of some embodiments, an exemplary device comprises logic to receive a plurality of video frames from a video source. In an aspect of some embodiments, the device comprises logic to process the plurality of video frames to produce a plurality of processed video frames, the plurality of processed video frames comprising one or more processed partial video frames. In an aspect of some embodiments, the device comprises logic to provide at least some of the plurality of processed video frames to a video sink. In an aspect of some embodiments, the one or more processed partial frames reduces a display latency of one or more of the video frames provided to the video sink. In an aspect of some embodiments, the device comprises logic to selectively disable the logic to process the plurality of video frames based on an application associated with the video frames, configuration settings, or user controls.

In an aspect of some embodiments, receiving the plurality of video frames comprises receiving one or more encoded partial video frames. In an aspect of some embodiments, processing the plurality of video frames comprises creating the one or more partial video frames from one of the plurality of received video frames.

In an aspect of some embodiments, the plurality of video frames received from the video source comprises a plurality of encoded video frames. In an aspect of some embodiments, processing the plurality of video frames comprises decoding at least some of the plurality of encoded video frames to produce a plurality of decoded video frames, the plurality of decoded video frames comprising one or more decoded partial video frames. In an aspect of some embodiments, providing at least some of the plurality of processed video frames to the video sink comprises providing at least some of the plurality of decoded video frames to the video sink. In an aspect of some embodiments, reducing the display latency of each of the decoded video frames provided to the video sink further comprises providing a decoded partial video frame to the video sink. In an aspect of some embodiments, providing at least some of the plurality of decoded video frames to the video sink comprises providing each of the plurality of decoded video frames, including the decoded partial video frame, to the video sink via a High-Definition Multimedia Interface (HDMI) connection.

In an aspect of some embodiments, providing at least some of the plurality of decoded video frames to the video sink comprises providing at least some of the plurality of decoded video frames to the video sink via a High-Definition Multimedia Interface (HDMI) connection. In an aspect of some embodiments, providing at least some of the plurality of decoded video frames to the video sink comprises providing the decoded partial video frame to the video sink via an alternate path separate from the HDMI connection. In an aspect of some embodiments, the device comprises logic to provide the video sink with metadata enabling the video sink to use the decoded partial video frame to create a decoded full video frame.

In an aspect of some embodiments, the plurality of encoded video frames comprises one or more encoded partial video frames encoded with adaptive resolution. In an aspect of some embodiments, decoding the one or more encoded partial video frames comprises decoding the one or more encoded partial video frames encoded with adaptive resolution.

In an aspect of some embodiments, the plurality of encoded video frames comprises a first encoded full video frame encoded at a first resolution. In an aspect of some embodiments, the plurality of encoded video frames comprises an encoded partial video frame subsequent to the encoded full video frame, the encoded partial video frame being encoded at a second resolution. In an aspect of some embodiments, decoding at least some of the plurality of encoded video frames comprises decoding the encoded full video frame to produce a decoded full video frame. In an aspect of some embodiments, decoding at least some of the plurality of encoded video frames comprises decoding the encoded partial video frame to produce a decoded partial video frame.

In an aspect of some embodiments, providing at least some of the plurality of decoded video frames to the video sink comprises providing the decoded partial video frame to the video sink.

In an aspect of some embodiments, processing the plurality of video frames comprises producing a second decoded full video frame from the first decoded full video frame and the decoded partial video frame. In an aspect of some embodiments, providing at least some of the plurality of decoded video frames to the video sink comprises providing the second decoded full video frame to the video sink.

In an aspect of some embodiments, the encoded partial video frame comprises content predicted from a portion of the encoded full video frame corresponding to the encoded partial video frame using inter-frame coding.

In an aspect of some embodiments, processing the plurality of video frames comprises storing the first decoded full video frame in a reference buffer. In an aspect of some embodiments, processing the plurality of video frames comprises receiving a second encoded full video frame subsequent to the encoded partial video frame, the second encoded full video frame encoded with inter-frame encoding from the first encoded full video frame. In an aspect of some embodiments, processing the plurality of video frames comprises decoding the second encoded full video frame, using the first decoded full video frame, to produce a second decoded full video frame. In an aspect of some embodiments, providing at least some of the plurality of decoded video frames to the video sink comprises providing the second decoded full video frame to the video sink.

In an aspect of some embodiments, the device comprises logic to receive information from the video source indicating a location of the encoded partial video frame within a full frame.

In an aspect of some embodiments, processing the plurality of video frames comprises calculating a location of the decoded partial video frame within a full frame. In an aspect of some embodiments, processing the plurality of video frames comprises providing information to the video sink indicating the location of the decoded partial video frame within the full frame.

In an aspect of some embodiments, the device is a set-top box, a component of a set-top box or a system on a chip (SoC). In an aspect of some embodiments, the device is a television.

In an aspect of some embodiments, a device comprises logic to receive a plurality of video frames from a video source at a fixed frame rate, the plurality of received video frames comprising a video frame that comprises a first plurality of sub-frames. In an aspect of some embodiments, the device comprises logic to process at least some of the plurality of video frames to produce a plurality of processed video frames. In an aspect of some embodiments, processing at least some of the plurality of video frames comprises processing at least some of the first plurality of sub-frames. In an aspect of some embodiments, processing at least some of the plurality of the video frames decouples the fixed frame rate of the received video frames from a flexible frame rate of the processed video frames. In an aspect of some embodiments, the device comprises logic to provide at least some of the plurality of processed video frames, including at least some of the processed first plurality of sub-frames, to a video sink at the flexible frame rate. In an aspect of some embodiments, the device comprises logic to selectively disable the decoupling of the fixed frame rate from the flexible frame rate and the providing of the processed video frames at the flexible frame rate based on an application associated with the video frames, configuration settings, and/or user controls.

In an aspect of some embodiments, processing at least some of the plurality of video frames comprises encoding the at least some of the plurality of video frames with a video coder/decoder (CODEC) for transmission over a network. In an aspect of some embodiments, the received plurality of video frames comprises a plurality of encoded video frames encoded with a video CODEC. In an aspect of some embodiments, processing at least some of the plurality of video frames comprises decoding the at least some of the plurality of video frames to produce a plurality of decoded video frames.

In an aspect of some embodiments, providing each of the plurality of processed frames at the flexible frame rate comprises providing each of the plurality of processed frames at the flexible frame rate comprises providing a first set of the plurality of decoded video frames to the video sink via dedicated multimedia interface. In an aspect of some embodiments, providing each of the plurality of processed frames at the flexible frame rate comprises providing a second set of the plurality of decoded video frames to the video sink via local area network.

In an aspect of some embodiments, providing least some of the processed first plurality of sub-frames to the video sink comprises providing fewer than all of the processed first plurality of sub-frames to the video sink. In an aspect of some embodiments, processing at least some of the first plurality of sub-frames comprises processing fewer than all of the first plurality of sub-frames. In an aspect of some embodiments, providing least some of the processed first plurality of sub-frames to the video sink comprises providing at least some of the processed sub-frames as parts of separate streams. In an aspect of some embodiments, providing least some of the processed first plurality of sub-frames to the video sink comprises providing the processed sub-frames as part of a single stream.

In an aspect of some embodiments, providing the plurality of processed video frames to the video sink comprises producing a processed video frame from at least some of the processed first plurality of sub-frames and a prior processed video frame. In an aspect of some embodiments, providing the plurality of processed video frames to the video sink comprises providing the processed video frame to the video sink.

In an aspect of some embodiments, decoding at least some of the plurality of encoded video frames to produce a plurality of decoded video frames comprises decoding two or more of the first plurality of sub-frames in parallel. In an aspect of some embodiments, receiving the plurality of encoded video frames from the video source comprises receiving at least some of the first plurality of sub-frames as separate streams. In an aspect of some embodiments, receiving the first plurality of encoded video frames from the video source comprises receiving the first plurality of sub-frames as a single stream.

In an aspect of some embodiments, receiving the plurality of video frames from the video source comprises receiving receive a full video frame. In an aspect of some embodiments, processing at least some of the plurality of video frames comprises dividing the full video frame into a second plurality of sub-frames. In an aspect of some embodiments, providing each of the plurality of processed video frames to the video sink at the flexible frame rate comprises providing at least some of the second plurality of sub-frames to the video sink.

In an aspect of some embodiments, processing at least some of the plurality of received video frames comprises processing the at least some of the plurality of received video frames at a rate higher than the fixed frame rate. In an aspect of some embodiments, providing each of the plurality of processed video frames to the video sink at the flexible frame rate comprises providing each of the plurality of processed video frames to the video sink, without post-processing buffering, at the rate at which each respective frame has been processed.

In an aspect of some embodiments, each of the received plurality of frames has a decode canvas with a first canvas size. In an aspect of some embodiments, each of the processed video frames has a display canvas with a second canvas size smaller than the first canvas size, the display canvas comprising a portion of the decode canvas. In an aspect of some embodiments, the portion of the decode canvas the display canvas comprises changes between subsequent frames.

In an aspect of some embodiments, a method comprises receiving, by a device, a plurality of video frames from a video source. In an aspect of some embodiments, the method comprises processing the plurality of video frames. In an aspect of some embodiments, the method comprises providing at least some of the plurality of video frames to a video sink. In an aspect of some embodiments, processing the plurality of video frames reduces a display latency of each of the video frames provided to the video sink by reducing a number of video frames in a video pipeline associated with the device.

In an aspect of some embodiments, another exemplary method comprises receiving a plurality of video frames from a video source. In an aspect of some embodiments, the method comprises processing the plurality of video frames to produce a plurality of processed video frames, the plurality of processed video frames comprising one or more processed partial video frames. In an aspect of some embodiments, the method comprises providing at least some of the plurality of processed video frames to a video sink. In an aspect of some embodiments, the one or more processed partial frames reduces a display latency of one or more of the video frames provided to the video sink.

In an aspect of some embodiments, another method comprises receiving a plurality of video frames from a video source at a fixed frame rate, the plurality of received video frames comprising a video frame that comprises a first plurality of sub-frames. In an aspect of some embodiments, the method comprises processing at least some of the plurality of video frames to produce a plurality of processed video frames. In an aspect of some embodiments, processing at least some of the plurality of video frames comprises processing at least some of the first plurality of sub-frames. In an aspect of some embodiments, processing at least some of the plurality of the video frames decouples the fixed frame rate of the received video frames from a flexible frame rate of the processed video frames. In an aspect of some embodiments, the method comprises providing at least some of the plurality of processed video frames, including at least some of the processed first plurality of sub-frames, to a video sink at the flexible frame rate.

CONCLUSION

In the foregoing description, for the purposes of explanation, numerous details are set forth to provide a thorough understanding of the described embodiments. It will be apparent to one skilled in the art, however, that other embodiments may be practiced without some of these details. In other instances, structures and devices are shown in block diagram form without full detail for the sake of clarity. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Thus, the foregoing description provides illustration and description of some features and aspect of various embodiments, but it is not intended to be exhaustive or to limit the embodiments in general to the precise form disclosed. One skilled in the art will recognize that modifications may be made in light of the above disclosure or may be acquired from practice of the implementations, all of which can fall within the scope of various embodiments. For example, as noted above, the methods and processes described herein may be implemented using software components, firmware and/or hardware components (including without limitation processors, other hardware circuitry, custom integrated circuits (ICs), programmable logic, etc.), and/or any combination thereof.

Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Likewise, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise.

As used herein, the term "component" is intended to be broadly construed as hardware, firmware, software, or a combination of any of these. It will be apparent that systems and/or methods described herein may be implemented in different forms of hardware, firmware, and/or a combination of hardware and software. The actual specialized control hardware or software code used to implement these systems and/or methods does not limit any embodiments unless specifically recited in the claims below. Thus, when the operation and behavior of the systems and/or methods are described herein without reference to specific software code, one skilled in the art would understand that software and hardware can be used to implement the systems and/or methods based on the description herein.

In this disclosure, when an element is referred to herein as being "connected" or "coupled" to another element, it is to be understood that one element can be directly connected to the other element or have intervening elements present between the elements. In contrast, when an element is referred to as being "directly connected" or "directly coupled" to another element, it should be understood that no intervening elements are present in the "direct" connection between the elements. However, the existence of a direct connection does not preclude other connections, in which intervening elements may be present. Similarly, while the methods and processes described herein may be described in a particular order for ease of description, it should be understood that, unless the context dictates otherwise, intervening processes may take place before and/or after any portion of the described process, and, as noted above, described procedures may be reordered, added, and/or omitted in accordance with various embodiments.

In this application, the use of the singular includes the plural unless specifically stated otherwise, and use of the term "and" means "and/or" unless otherwise indicated. Also, as used herein, the term "or" is intended to be inclusive when used in a series and also may be used interchangeably with "and/or," unless explicitly stated otherwise (e.g., if used in combination with "either" or "only one of"). Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

Unless otherwise indicated, all numbers used herein to express quantities, dimensions, and so forth should be understood as being modified in all instances by the term "about." As used herein, the articles "a" and "an" are intended to include one or more items and may be used interchangeably with "one or more." Similarly, as used herein, the article "the" is intended to include one or more items referenced in connection with the article "the" and may be used interchangeably with "the one or more." As used herein, the term "set" is intended to include one or more items (e.g., related items, unrelated items, a combination of related and unrelated items, and/or the like), and may be used interchangeably with "one or more." Where only one item is intended, the phrase "only one" or similar language is used. As used herein, the terms "has," "have," "having," or the like are intended to be open-ended terms. Further, the phrase "based on" is intended to mean "based, at least in part, on" unless explicitly stated otherwise. In the foregoing description, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Thus, while each dependent claim listed below may directly depend on only one claim, the disclosure of various implementations includes each dependent claim in combination with every other claim in the claim set. No element, act, or instruction used herein should be construed as critical or essential unless explicitly described as such.

The invention claimed is:
1. A device, comprising:
logic to receive a plurality of video frames from a video source at a fixed frame rate, the plurality of received video frames comprising a video frame that comprises a first plurality of sub-frames;
logic to process at least some of the plurality of video frames to produce a plurality of processed video frames, wherein:
processing at least some of the plurality of video frames comprises processing at least some of the first plurality of sub-frames; and
processing at least some of the plurality of the video frames decouples the fixed frame rate of the received video frames from a flexible frame rate of the processed video frames; and
logic to provide at least some of the plurality of processed video frames, including at least some of the processed first plurality of sub-frames, to a video sink at the flexible frame rate.
2. The device of claim 1, wherein:
processing at least some of the plurality of video frames comprises encoding the at least some of the plurality of video frames with a video coder/decoder (CODEC) for transmission over a network.
3. The device of claim 1, wherein:
the received plurality of video frames comprises a plurality of encoded video frames encoded with a video CODEC; and
processing at least some of the plurality of video frames comprises:
decoding the at least some of the plurality of video frames to produce a plurality of decoded video frames.
4. The device of claim 3, wherein:
providing each of the plurality of processed frames at the flexible frame rate comprises:
providing a first set of the plurality of decoded video frames to the video sink via dedicated multimedia interface; and
providing a second set of the plurality of decoded video frames to the video sink via local area network.
5. The device of claim 4, wherein:
providing least some of the processed first plurality of sub-frames to the video sink comprises:
providing fewer than all of the processed first plurality of sub-frames to the video sink.
6. The device of claim 1, wherein:
processing at least some of the first plurality of sub-frames comprises:
processing fewer than all of the first plurality of sub-frames.
7. The device of claim 1, wherein:
providing least some of the processed first plurality of sub-frames to the video sink comprises:
providing at least some of the processed sub-frames as parts of separate streams.

8. The device of claim 1, wherein:

providing least some of the processed first plurality of sub-frames to the video sink comprises:

providing the processed sub-frames as part of a single stream.

9. The device of claim 1, wherein:

providing the plurality of processed video frames to the video sink comprises:

producing a processed video frame at least some of the processed first plurality of sub-frames and a prior processed video frame; and providing the processed video frame to the video sink.

10. The device of claim 1, wherein:

decoding at least some of the plurality of encoded video frames to produce a plurality of decoded video frames comprises:

decoding two or more of the first plurality of sub-frames in parallel.

11. The device of claim 1, wherein:

receiving the plurality of encoded video frames from the video source comprises:

receiving at least some of the first plurality of sub-frames as separate streams.

12. The device of claim 1, wherein:

receiving the first plurality of encoded video frames from the video source comprises:

receiving the first plurality of sub-frames as a single stream.

13. The device of claim 1, wherein:

receiving the plurality of video frames from the video source comprises:

receiving receive a full video frame;

processing at least some of the plurality of video frames comprises:

dividing the full video frame into a second plurality of sub-frames; and providing each of the plurality of processed video frames to the video sink at the flexible frame rate comprises:

providing at least some of the second plurality of sub-frames to the video sink.

14. The device of claim 1, wherein:

processing at least some of the plurality of received video frames comprises:

processing the at least some of the plurality of received video frames at a rate higher than the fixed frame rate; and providing each of the plurality of processed video frames to the video sink at the flexible frame rate comprises:

providing each of the plurality of processed video frames to the video sink, without post-processing buffering, at the rate at which each respective frame has been processed.

15. The device of claim 1, wherein the device comprises a set-top box, a component of a set-top box, or a system on a chip (SoC).

16. The device of claim 1, wherein the device is a television.

17. The device of claim 1, wherein:

each of the received plurality of frames has a decode canvas with a first canvas size;

each of the processed video frames has a display canvas with a second canvas size smaller than the first canvas size, the display canvas comprising a portion of the decode canvas; and the portion of the decode second canvas that the display canvas comprises changes between subsequent frames.

18. The device of claim 1, further comprising:

logic to selectively disable the decoupling of the fixed frame rate from the flexible frame rate and the providing of the processed video frames at the flexible frame rate based on:

an application associated with the video frames;

configuration settings; or user controls.

19. A method, comprising:

receiving a plurality of video frames from a video source at a fixed frame rate, the plurality of received video frames comprising a video frame that comprises a first plurality of sub-frames;

processing at least some of the plurality of video frames to produce a plurality of processed video frames, wherein:

processing at least some of the plurality of video frames comprises processing at least some of the first plurality of sub-frames; and processing at least some of the plurality of the video frames decouples the fixed frame rate of the received video frames from a flexible frame rate of the processed video frames; and providing at least some of the plurality of processed video frames, including at least some of the processed first plurality of sub-frames, to a video sink at the flexible frame rate.

20. A set-top box, comprising:

an input interface configured to receive a plurality of video frames from a video source at a fixed frame rate, the plurality of received video frames comprising a video frame that comprises a first plurality of sub-frames;

a processor configured to process at least some of the plurality of video frames to produce a plurality of processed video frames, wherein:

processing at least some of the plurality of video frames comprises processing at least some of the first plurality of sub-frames; and processing at least some of the plurality of the video frames decouples the fixed frame rate of the received video frames from a flexible frame rate of the processed video frames;

an output interface configured to provide at least some of the processed video frames, including at least some of the plurality of processed sub-frames, to a video sink at the flexible frame rate.

\* \* \* \* \*